(12) United States Patent
Hoshi et al.

(10) Patent No.: US 10,724,464 B2
(45) Date of Patent: Jul. 28, 2020

(54) ESTIMATION DEVICE AND CONTROL DEVICE FOR COMBUSTION SYSTEM

(71) Applicant: DENSO CORPORATION, Kariya, Aichi-pref. (JP)

(72) Inventors: Shinya Hoshi, Kariya (JP); Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 146 days.

(21) Appl. No.: 15/773,578

(22) PCT Filed: Sep. 13, 2016

(86) PCT No.: PCT/JP2016/076876
§ 371 (c)(1),
(2) Date: May 4, 2018

(87) PCT Pub. No.: WO2017/081928
PCT Pub. Date: May 18, 2017

(65) Prior Publication Data
US 2018/0320621 A1 Nov. 8, 2018

(30) Foreign Application Priority Data
Nov. 12, 2015 (JP) ................................. 2015-222310

(51) Int. Cl.
*F02D 41/22* (2006.01)
*F02D 43/00* (2006.01)
(Continued)

(52) U.S. Cl.
CPC .......... *F02D 41/222* (2013.01); *F02D 35/02* (2013.01); *F02D 35/028* (2013.01);
(Continued)

(58) Field of Classification Search
CPC .... F02D 35/02; F02D 41/0025; F02D 41/047; F02D 2200/0611; F02D 2200/0612; F02D 2200/0614; F02D 2250/11
See application file for complete search history.

(56) References Cited

U.S. PATENT DOCUMENTS

2004/0182377 A1* 9/2004 Johnsson ............ F02D 41/0025
                                                      123/679
2009/0114288 A1* 5/2009 Grant .................. F02D 19/0628
                                                       137/88
(Continued)

FOREIGN PATENT DOCUMENTS

JP    2003106186 A  *  4/2003
JP    2004251136 A  *  9/2004
(Continued)

OTHER PUBLICATIONS

U.S. Appl. No. 15/773,578, filed May 4, 2018, Estimation Device and Control Device for Combustion System.
(Continued)

*Primary Examiner* — John M Zaleskas
(74) *Attorney, Agent, or Firm* — Nixon & Vanderhye P.C.

(57) ABSTRACT

An estimation device is applicable to a combustion system in which relative movement of a piston to a cylinder is lubricated with a lubricating oil. An estimation device includes a mixing acquisition unit and a piercing force estimation unit. The mixing acquisition unit acquires a mixing ratio of various components contained in a fuel injected into the combustion chamber. The piercing force estimation unit estimates a piercing force of the fuel injected into the combustion chamber according to the mixing ratio acquired with the mixing acquisition unit to manage reach of the fuel, which is injected into the combustion chamber of the internal combustion engine, at least one of the cylinder and the piston.

8 Claims, 13 Drawing Sheets

(51) Int. Cl.
| | |
|---|---|
| *F02D 45/00* | (2006.01) |
| *F02D 41/00* | (2006.01) |
| *F02D 41/04* | (2006.01) |
| *F02D 35/02* | (2006.01) |
| *F02D 41/14* | (2006.01) |

(52) U.S. Cl.
CPC ....... *F02D 41/0025* (2013.01); *F02D 41/047* (2013.01); *F02D 43/00* (2013.01); *F02D 45/00* (2013.01); F02D 2041/1433 (2013.01); F02D 2041/226 (2013.01); F02D 2200/021 (2013.01); F02D 2200/0612 (2013.01); F02D 2200/0614 (2013.01); *F02D 2250/11* (2013.01); *Y02T 10/40* (2013.01)

(56) References Cited

U.S. PATENT DOCUMENTS

| | | | | |
|---|---|---|---|---|
| 2011/0155097 | A1* | 6/2011 | Matsumura et al. | F02D 41/401 123/299 |
| 2014/0299105 | A1* | 10/2014 | Hou | F02B 23/0669 123/478 |
| 2015/0292418 | A1* | 10/2015 | Haft | F02D 41/0025 701/103 |
| 2016/0258345 | A1* | 9/2016 | Kimura | F02D 41/402 |
| 2016/0363074 | A1* | 12/2016 | Hoshi | F02D 41/1454 |
| 2016/0363084 | A1* | 12/2016 | Hoshi | F02D 41/26 |
| 2017/0009621 | A1* | 1/2017 | Ogata | F02D 41/0025 |
| 2018/0320616 | A1* | 11/2018 | Hoshi | F02D 41/02 |
| 2018/0320627 | A1* | 11/2018 | Hoshi | F02D 41/38 |
| 2018/0320628 | A1* | 11/2018 | Okabayashi | F02D 45/00 |
| 2019/0024597 | A1* | 1/2019 | Okabayashi | F02D 45/00 |
| 2019/0063356 | A1* | 2/2019 | Hoshi | F02D 41/1458 |

FOREIGN PATENT DOCUMENTS

| | | |
|---|---|---|
| JP | 2008-255925 | 10/2008 |
| JP | 2009036079 A * | 2/2009 |
| JP | 2010-169549 | 8/2010 |
| JP | 2011-236788 | 11/2011 |
| JP | 2011236788 A * | 11/2011 |
| JP | 2012021435 A * | 2/2012 |
| JP | 2013-24138 | 2/2013 |
| JP | 2013024138 A * | 2/2013 |
| JP | 2014-20211 | 2/2014 |

OTHER PUBLICATIONS

U.S. Appl. No. 15/773,583, filed May 4, 2018, Estimation Device and Control Device for Combustion System.
U.S. Appl. No. 15/773,584, filed May 4, 2018, Estimation Device and Control Device for Combustion System.
U.S. Appl. No. 15/773,590, filed May 4, 2018, Estimation Device and Control Device for Combustion System.
U.S. Appl. No. 15/77,604, filed May 4, 2018, Combustion System Estimation Device and Control Device.
U.S. Appl. No. 15/773,625, filed May 4, 2018, Estimation Device and Control Device for Combustion System.
T. Ohta, "Diesel Spray", http://www.geocities.jp/bequemereise/diesel_comb2.html, (4 pages) and English translation (4 pages) 1995.
U.S. Appl. No. 15/773,583 of Hoshi, et al., filed May 4, 2018, entitled Estimation Device and Control Device for Combustion System (52 pages).
U.S. Appl. No. 15/773,584 of Hoshi, et al., filed May 4, 2018, entitled Estimation Device and Control Device for Combustion System (66 pages).
U.S. Appl. No. 15/773,590 of Hoshi, et al., filed May 4, 2018, entitled Estimation Device and Control Device for Combustion System (70 pages).
U.S. Appl. No. 15/773,604 of Okabayashi, et al., filed May 4, 2018, entitled Combustion System Estimation Device and Control Device, (70 pages).
U.S. Appl. No. 15/773,625 of Hoshi, et al., filed May 4, 2018, Estimation Device and Control Device for Combustion System, (60 pages).

* cited by examiner

FIG. 3

MOLECULAR STRUCTURAL SPECIES $\begin{Bmatrix} \text{MIXING AMOUNT OF LINEAR PARAFFINS} \\ \text{MIXING AMOUNT OF NAPHTHENES} \\ \text{MIXING AMOUNT OF SIDE CHAIN PARAFFINS} \\ \text{MIXING AMOUNT OF AROMATICS} \\ \cdots \end{Bmatrix}$

=

NUMERICAL VALUE $\begin{Bmatrix} a_{00} & \cdots & a_{0Y} \\ \vdots & \ddots & \vdots \\ a_{X0} & \cdots & a_{XY} \end{Bmatrix}$

·

$\begin{Bmatrix} \text{IGNITION DELAY TIM TD}(i) \\ \text{IGNITION DELAY TIM TD}(j) \\ \text{IGNITION DELAY TIM TD}(k) \\ \text{IGNITION DELAY TIM TD}(l) \\ \cdots \end{Bmatrix}$

COMBUSTION TENDENCY PARAMETER

: $P(i), T(i), O_2(i), Pc(i)$
: $P(j), T(j), O_2(j), Pc(j)$
: $P(k), T(k), O_2(k), Pc(k)$
: $P(l), T(l), O_2(l), Pc(l)$

FIG. 4
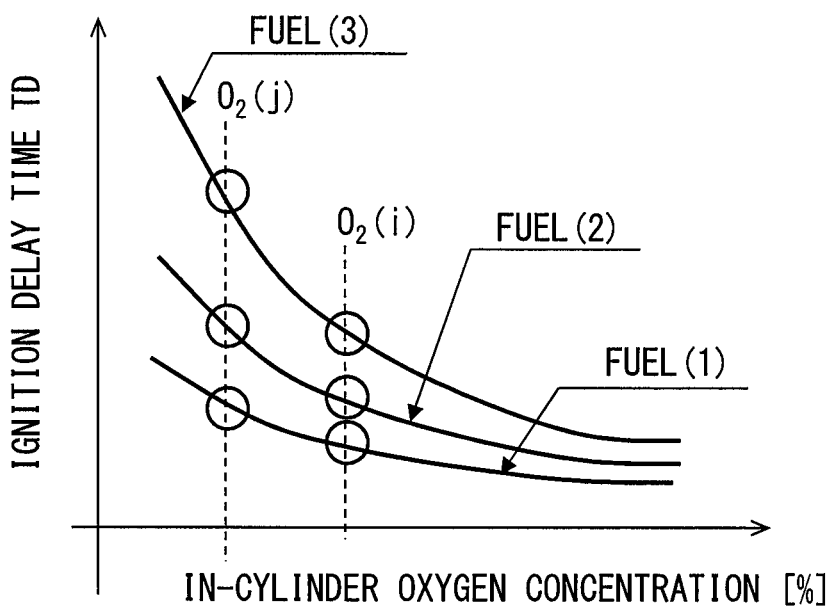
FIG. 5
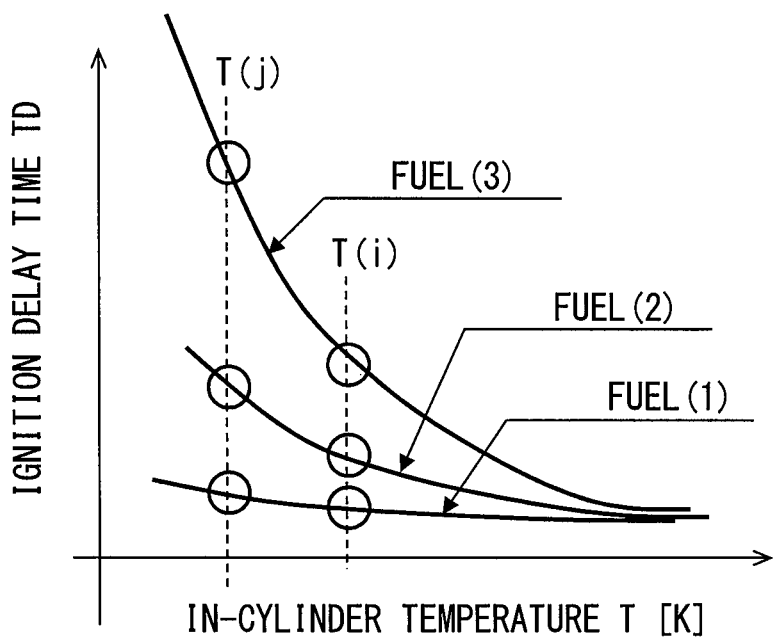
FIG. 6
| | MOLECULAR STRUCTURAL SPECIES A | MOLECULAR STRUCTURAL SPECIES B | MOLECULAR STRUCTURAL SPECIES C |
|---|---|---|---|
| FUEL (1) | LARGE | LARGE | SMALL |
| FUEL (2) | SMALL | LARGE | SMALL |
| FUEL (3) | LARGE | SMALL | LARGE |

FIG. 12

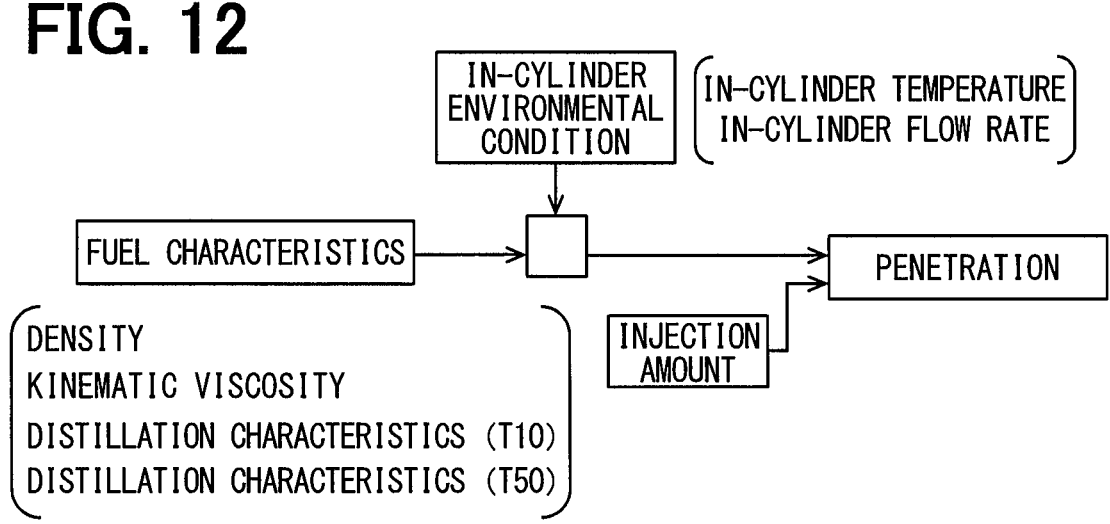

FIG. 13

$$\begin{pmatrix} \text{PENETRATION P1} \\ \text{PENETRATION P2} \\ \text{PENETRATION P3} \\ \cdots \end{pmatrix} = \begin{pmatrix} b_{00} & \cdots & b_{0Y} \\ \vdots & \ddots & \vdots \\ b_{X0} & \cdots & b_{XY} \end{pmatrix} \cdot \begin{pmatrix} \text{KINEMATIC VISCOSITY} \\ \text{DENSITY} \\ \text{DISTILLATION CHARACTERISTICS : T10} \\ \text{DISTILLATION CHARACTERISTICS : T50} \\ \cdots \end{pmatrix}$$

FIG. 14

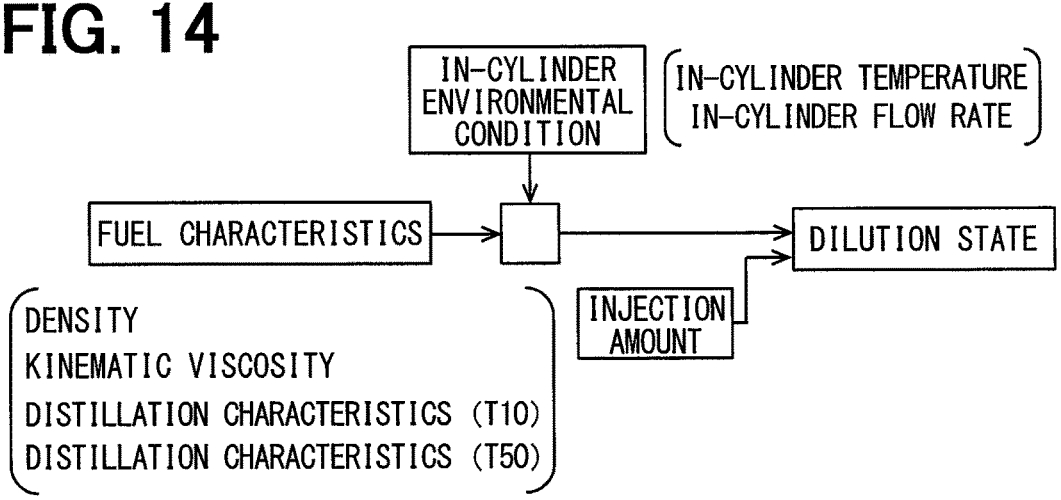

FIG. 15

$$\begin{pmatrix} \text{DILUTION STATE D1} \\ \text{DILUTION STATE D2} \\ \text{DILUTION STATE D3} \\ \cdots \end{pmatrix} = \begin{pmatrix} c_{00} & \cdots & c_{0Y} \\ \vdots & \ddots & \vdots \\ c_{X0} & \cdots & c_{XY} \end{pmatrix} \cdot \begin{pmatrix} \text{KINEMATIC VISCOSITY} \\ \text{DENSITY} \\ \text{DISTILLATION CHARACTERISTICS . T10} \\ \text{DISTILLATION CHARACTERISTICS : T50} \end{pmatrix}$$

FIG. 16

$$\underbrace{Q_{burn}[J]}_{\text{COMBUSTION AMOUNT}} = \underbrace{\alpha\,[-]}_{\text{COMBUSTION RATE}} \cdot \underbrace{\rho\,[g/mm^3] \cdot Q_{inj}[mm^3/st]}_{\text{INJECTION AMOUNT}} \cdot \underbrace{A\,[J/g]}_{\text{LOWER HEAT GENERATION AMOUNT}}$$

FIG. 17

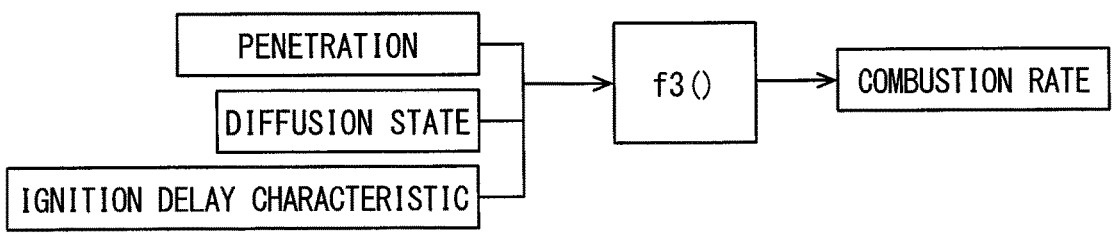

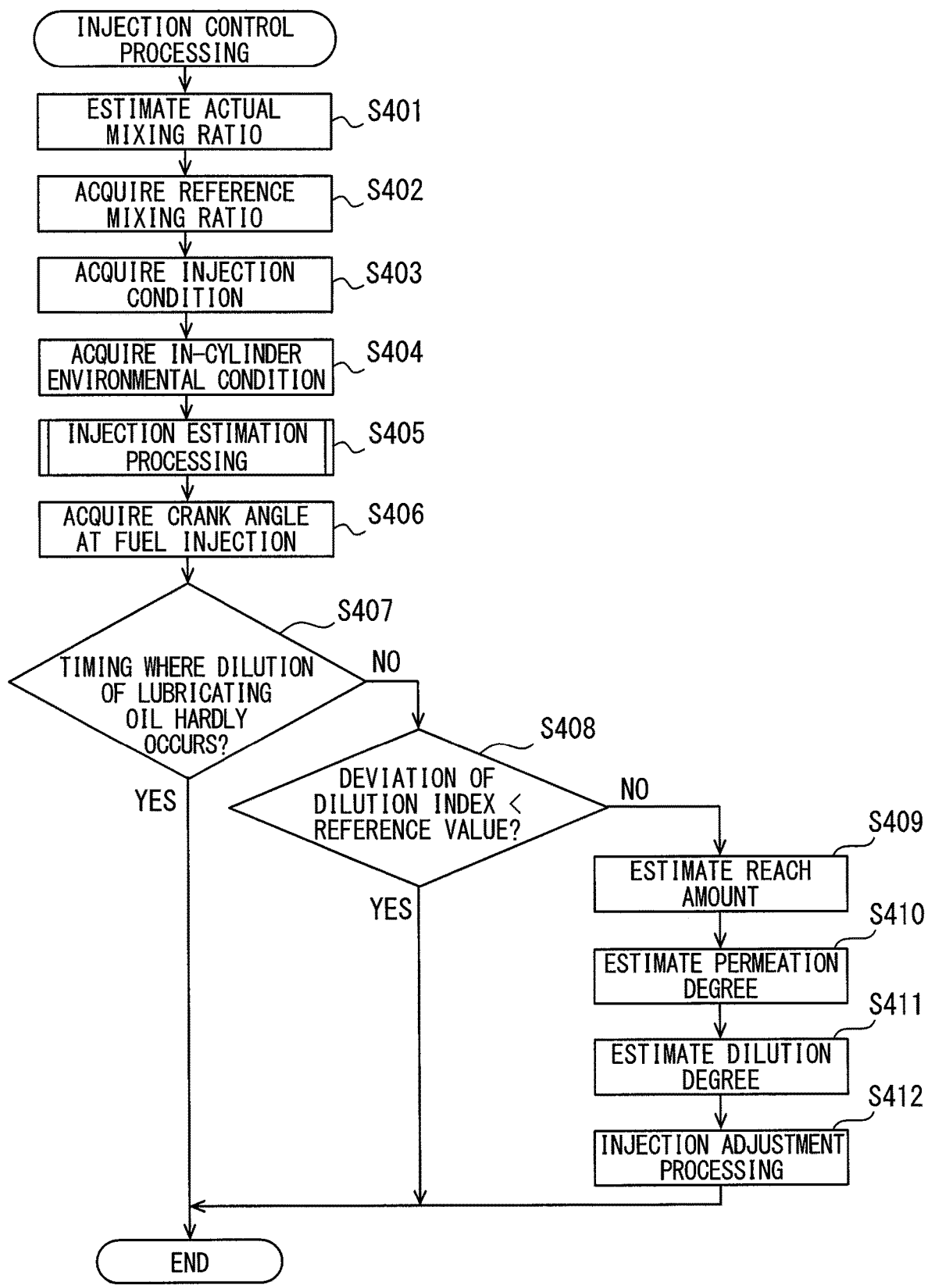

ESTIMATION DEVICE AND CONTROL DEVICE FOR COMBUSTION SYSTEM

CROSS REFERENCE TO RELATED APPLICATION

This application is the U.S. national phase of International Application No. PCT/JP2016/076876 filed Sep. 13, 2016, which designated the U.S. and claims priority to Japanese Patent Application No. 2015-222310 filed on Nov. 12, 2015, the entire contents of each of which are incorporated herein by reference.

TECHNICAL FIELD

The present disclosure relates to an estimation device to perform estimation on fuel injection in a combustion system and a control device to perform a control on the combustion system.

BACKGROUND ART

Conventionally, a configuration, in which a combustion chamber of an internal combustion engine is partitioned off with a cylinder and a piston, is known. In this configuration, it is concerned that a fuel, which is injected into the combustion chamber, would leak through a clearance between the cylinder and the piston to result in dilution of lubricating oil, which is to smoothen relative movement of the piston to the cylinder.

On the other hand, a technology, which is to restrict dilution of a lubricating oil with a fuel, is proposed. For example, in Patent Literature 1, when a total injection quantity of fuel injected into a combustion chamber in one combustion cycle increases, an injection control is performed to increase a number of fuel injection. In this configuration, penetration of a fuel, which is injected into the combustion chamber, hardly increases excessively, and the fuel is restricted from adhering onto the cylinder or the piston in the combustion chamber. That is, it restricts fuel from leaking through the clearance between the cylinder and the piston.

PRIOR TECHNICAL LITERATURE

Patent Literature

PATENT LITERATURE 1: Publication of unexamined Japanese patent application No. 2014-20211

However, a fuel having various properties exist as a fuel used for combustion in internal combustion engines. Therefore, in a case where components contained in fuel differ or where a mixing ratio of the components differ, even under an injection condition, in which fuel should not reach the inner circumferential periphery of the cylinder, fuel would reach the inner circumferential periphery of the cylinder in reality due to, for example, increase in the penetration. Consequently, in a case where the injected fuel adheres onto the cylinder or the piston, it is concerned that the adhering fuel would leak through the clearance between the cylinder and the piston, and consequently, lubricating oil would be diluted with the fuel.

SUMMARY OF INVENTION

It is an object of the present disclosure to produce an estimation device and a control device to enable to properly manage dilution of a lubricating oil with a fuel in a combustion system.

According to a first aspect of the present disclosure, an estimation device is applicable to a combustion system, in which a combustion chamber of an internal combustion engine is partitioned off with a cylinder and a piston, which is movable in the cylinder, and in which relative movement of the piston to the cylinder is lubricated with a lubricating oil. The estimation device comprises a mixing acquisition unit to acquire a mixing ratio of various components contained in a fuel injected into the combustion chamber. The estimation device further comprises a piercing force estimation unit to estimate a piercing force of the fuel, which is injected into the combustion chamber, according to the mixing ratio acquired with the mixing acquisition unit to manage reach of the fuel, which is injected into the combustion chamber, at least one of the cylinder and the piston.

According to a second aspect of the present disclosure, a control device is applicable to a combustion system, in which a combustion chamber of an internal combustion engine is partitioned off with a cylinder and a piston, which is movable in the cylinder, and in which relative movement of the piston to the cylinder is lubricated with a lubricating oil. The control device comprises a mixing acquisition unit to acquire a mixing ratio of various components contained in a fuel injected into the combustion chamber. The control device further comprises a piercing force estimation unit to estimate a piercing force of the fuel, which is injected into the combustion chamber, according to the mixing ratio acquired with the mixing acquisition unit to manage reach of the fuel, which is injected into the combustion chamber, at least one of the cylinder and the piston. The control device further comprises a combustion control unit to control the combustion system according to an estimation result of the piercing force estimation unit.

BRIEF DESCRIPTION OF THE DRAWINGS

The above and other objects, features and advantages of the present disclosure will become more apparent from the following detailed description made with reference to the accompanying drawings. In the drawings:

The above and other objects, features and advantages of the present disclosure will become more apparent from the following detailed description made with reference to the accompanying drawings. In the drawings:

In the drawings:

FIG. 1 is a schematic diagram of a combustion system according to a first embodiment;

FIG. 2 is an illustrative diagram of an ignition delay time;

FIG. 3 is a diagram illustrating a relationship among multiple ignition delay times, parameters representing flammability, and mixing amounts of various components;

FIG. 4 is a diagram showing a relationship between a characteristic line representing a change in the ignition delay time caused due to an in-cylinder oxygen concentration and a molecular structural species of a fuel;

FIG. 5 is a diagram showing a relationship between the characteristic line representing a change in the ignition delay time caused due to an in-cylinder temperature and a molecular structural species of the fuel;

FIG. 6 is a view showing a relationship between a characteristic line specified based on an ignition delay time and a mixing ratio of a molecular structural species;

FIG. 7 is a flowchart showing a procedure of injection control processing;

FIG. 8 is a flowchart showing a procedure of injection estimation processing;

FIG. 9 is a diagram illustrating estimation of an injection amount as an injection parameter;

FIG. 10 is a diagram illustrating estimation of a lower heat generation amount as the injection parameter;

FIG. 11 is a diagram illustrating distillation characteristics;

Figure 18:
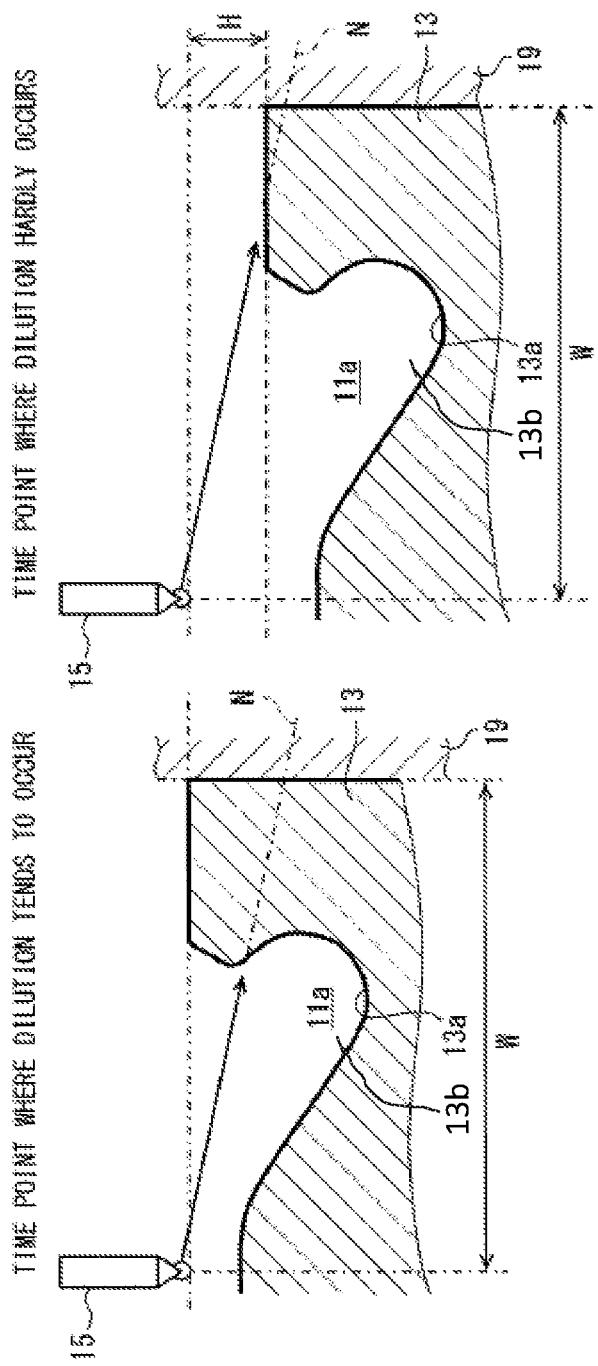
Figure 19:
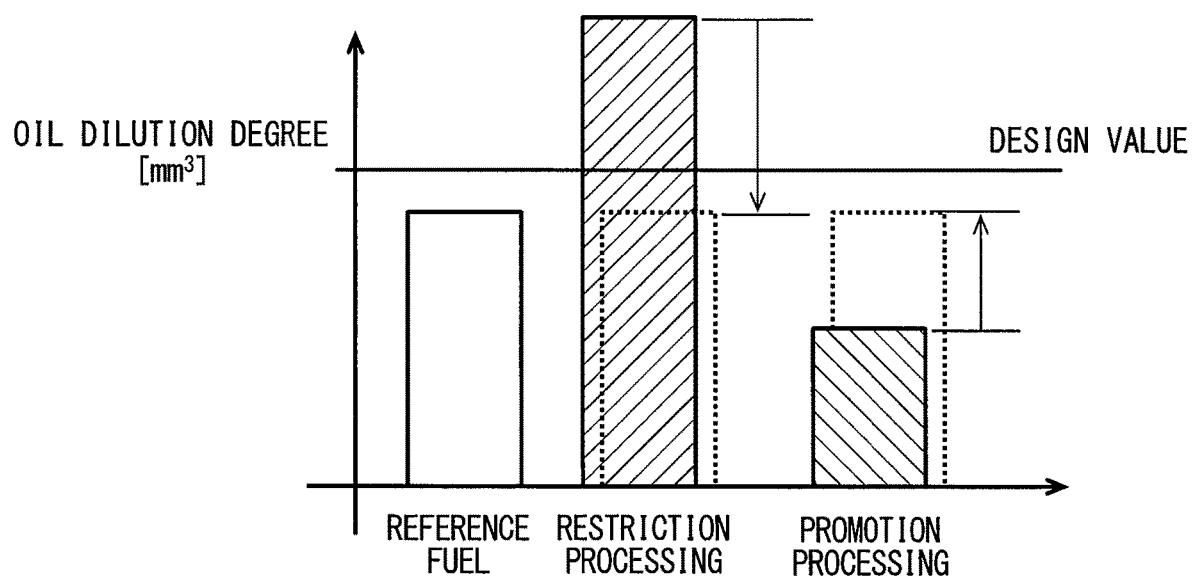
Figure 20:
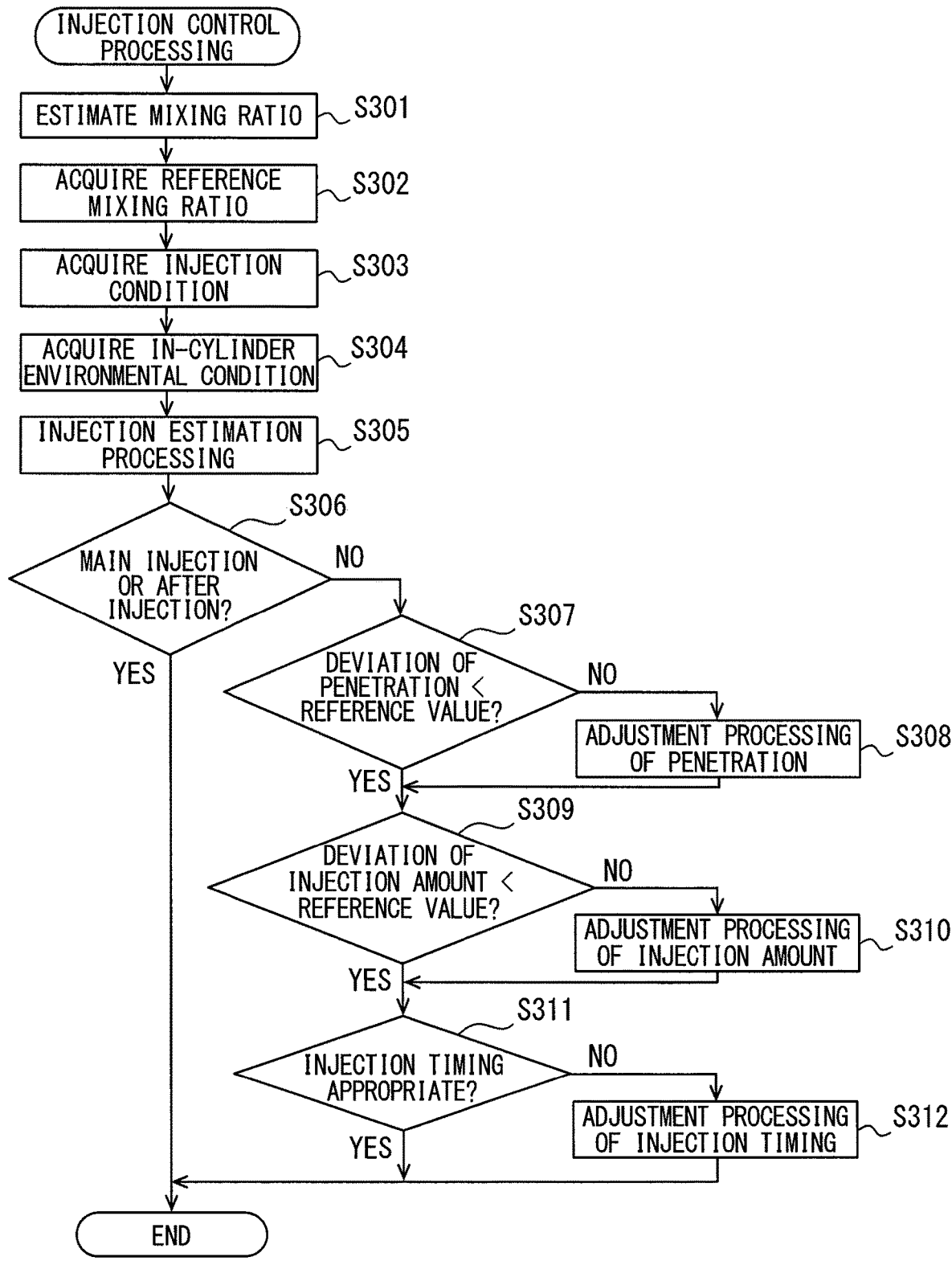

FIG. 12 is a diagram illustrating estimation of the penetration as an injection parameter;

FIG. 13 is a diagram showing a formula for estimating the penetration;

FIG. 14 is a diagram illustrating estimation of a diffusion state as the injection parameter;

FIG. 15 is a diagram showing a formula for estimating the diffusion state;

FIG. 16 is a diagram showing a formula for estimating a combustion amount as the combustion parameter;

FIG. 17 is a diagram showing a formula for estimating a combustion rate;

FIG. 18 is a view showing a relation between the position of a piston and an injection axis line;

FIG. 19 is a view showing a relation between a dilution degree and the injection adjustment processing;

FIG. 20 is a flowchart showing a procedure of the injection control processing according to the second embodiment; and FIG. 21 is a flowchart showing a procedure of the injection control processing according to a modification 12.

DESCRIPTION OF EMBODIMENTS

Hereinafter, multiple embodiments for carrying out the present disclosure will be described with reference to accompanying drawings. In the following description of the embodiments, the same reference numerals will be used to refer to the same and already described elements and description thereof will be omitted in some cases. An estimation device and a control device for a combustion system according to the present embodiment are produced with an electronic control device (ECU 80) shown in FIG. 1.

First Embodiment

Figure 1:
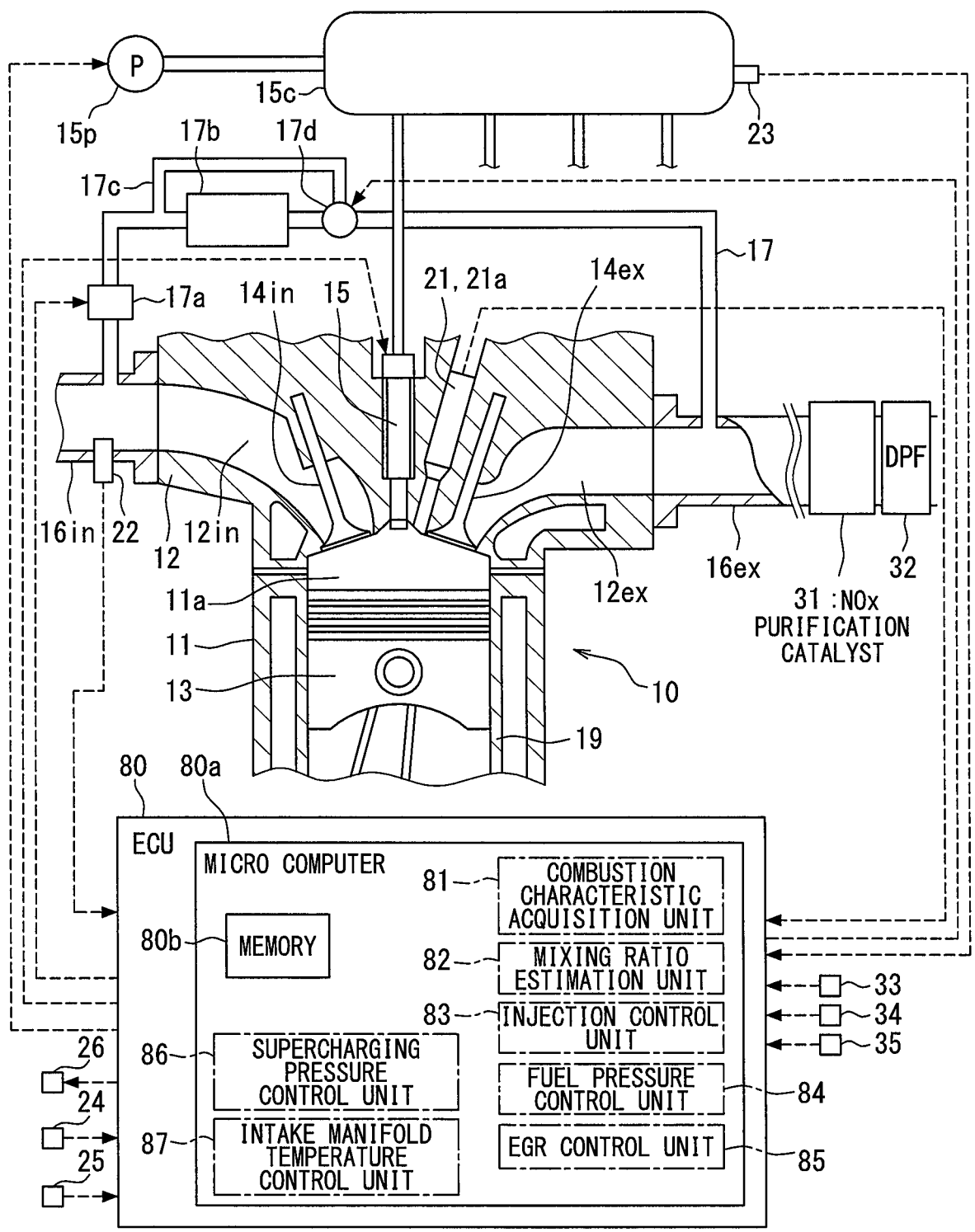

An estimation device and a control device for a combustion system according to the present embodiment are produced with an electronic control device (ECU 80) shown in FIG. 1. The ECU 80 includes a microcomputer (microcomputer 80$a$), an input processing circuit, an output processing circuit, and the like (none shown). The microcomputer 80$a$ includes a central processing unit (CPU) not shown and a memory 80$b$. The CPU executes a predetermined program stored in the memory 80$b$, thereby to cause the microcomputer 80$a$ to control the operation of a fuel injection valve 15, a fuel pump 15$p$, an EGR valve 17$a$, a temperature control valve 17$d$, and a supercharging pressure regulator 26 and the like included in the combustion system. Under those controls, a combustion state of the internal combustion engine 10 in the combustion system is controlled in a desired state. The combustion system and the ECU 80 are mounted in a vehicle, and the vehicle travels with the use of an output power of the internal combustion engine 10 as a driving source.

The internal combustion engine 10 includes a cylinder block 11, a cylinder head 12, a piston 13, and the like. An intake valve 14$in$, an exhaust valve 14$ex$, a fuel injection valve 15, and an in-cylinder pressure sensor 21 are equipped to the cylinder head 12.

The fuel pump 15$p$ pumps a fuel in the fuel tank to a common rail 15$c$. The ECU 80 controls the operation of the fuel pump 15$p$, as a result of which the fuel in the common rail 15$c$ is stored in the common rail 15$c$ in a state where the fuel is maintained at a target pressure Ptrg. The common rail 15$c$ distributes the accumulated fuel to the fuel injection valves 15 of the respective cylinders. The fuel injected from the fuel injection valve 15 mixes with an intake air in the combustion chamber 11$a$ to form an air-fuel mixture, and the air-fuel mixture is compressed by the piston 13 and self-ignited. In short, the internal combustion engine 10 is a compression self-ignition type diesel engine, and a light oil is used as the fuel. Incidentally, as the fuel injection by the fuel injection valve 15, there is spray spraying the fuel in the form of mist.

The internal combustion engine 10 has a tubular cylinder 19 defined with a cylinder block 11 and a cylinder head 12. The piston 13 is equipped inside the cylinder 19 in a state where it is movable in the axial direction of the cylinder 19. In this state, the outer periphery of the piston 13 and the inner circumferential periphery of the cylinder 19 are overlapped with each other.

In the internal combustion engine 10, the combustion chamber 11$a$ is partitioned off with the cylinder block 11, the cylinder head 12, the piston 13, and the like. The internal combustion engine 10 includes an oil sump to store lubricating oil, such as engine oil. The oil sump is equipped on the lower side of the cylinder block 11, thereby being located on the lower side of the combustion chamber 11$a$ and the cylinder 19. In a case where a fuel supplied to the combustion chamber 11$a$ leaks into a clearance between the piston 13 and the cylinder 19, the fuel flows downward and falls from the piston 13 and the cylinder 19, thereby being stored in the oil sump. In this case, the lubricating oil stored in the oil sump is diluted with the fuel.

Returning to FIG. 1, the fuel injection valve 15 is configured by accommodating a solenoid actuator and a valve element inside a body. When the ECU 80 causes the energization of the electromagnetic actuator, an electromagnetic attraction force of the electromagnetic actuator causes a leak passage of a back pressure chamber (not shown) to open. The valve body opens in association with a reduction in the back pressure, and an injection hole provided in the body is opened. Thus, the fuel is injected from the injection hole. When the energization is turned off, the valve body is closed and the fuel injection is stopped.

An intake pipe 16$in$ and an exhaust pipe 16$ex$ are connected to an intake port 12$in$ and an exhaust port 12$ex$, which are provided in the cylinder head 12, respectively. An EGR pipe 17 is connected to the intake pipe 16in and the exhaust pipe 16$ex$. A part (EGR gas) of the exhaust gas flows (returns) to the intake pipe 16$in$ through the EGR pipe 17. An EGR valve 17$a$ is equipped to the EGR pipe 17. The ECU 80 controls the operation of the EGR valve 17$a$, thereby to control an opening degree of the EGR pipe 17, and to control a flow rate of the EGR gas.

Furthermore, an EGR cooler 17$b$ for cooling the EGR gas, a bypass pipe 17$c$, and a temperature control valve 17$d$ are equipped to an upstream portion of the EGR valve 17$a$ of the EGR pipe 17. The bypass pipe 17$c$ defines a bypass flow channel that causes the EGR gas to bypass the EGR cooler 17$b$. The temperature control valve 17$d$ adjusts the opening degree of the bypass flow channel, thereby to adjust a ratio between the EGR gas flowing through the EGR cooler 17$b$ and the EGR gas flowing through the bypass flow channel, and finally to adjust a temperature of the EGR gas flowing into the intake pipe 16$in$. In this example, the intake air flowing into the intake port 12in contains an external air (fresh air) flowing from the intake pipe 16in and the EGR gas. Therefore, the adjustment of the temperature of the EGR gas with the temperature control valve 17d represents the adjustment of the temperature (intake manifold temperature) of the intake air flowing into the intake port 12in.

The combustion system is provided with a supercharger not shown. The supercharger has a turbine that is attached to the exhaust pipe 16ex and a compressor that is attached to the intake pipe 16in. When the turbine rotates due to a flow energy of the exhaust gas, the compressor rotates by the rotational force of the turbine, and the fresh air is compressed (supercharged) by the compressor. The supercharging pressure regulator 26 described above is a device for changing a capacity of the turbine. The ECU 80 controls the operation of the supercharging pressure regulator 26 to adjust the turbine capacity, thereby to control a supercharging pressure caused by the compressor.

In addition, the combustion system includes a NOx purification catalyst 31 and a DPF 32. The NOx purification catalyst 31 includes an adsorption catalyst that adsorbs nitrogen oxide NOx in the exhaust gas, a reduction catalyst that reduces NOx to nitrogen N2, and the like. The DPF 32 (Diesel Particulate Filter) is a fine particle collecting device that is located in the further downstream side of the NOx purification catalyst 31, and collects fine particles contained in the exhaust gas. The exhaust gas flowing through the exhaust pipe 16ex passes through both of the NOx purification catalyst 31 and the DPF 32 and is subsequently discharged from a downstream end of the exhaust pipe 16ex. In the combustion system, the NOx purification catalyst 31 and the DPF 32 configure an exhaust gas purification device.

The ECU 80 receives detection signals from various sensors such as the in-cylinder pressure sensor 21, an oxygen concentration sensor 22, a rail pressure sensor 23, a crank angle sensor 24, an accelerator pedal sensor 25, an exhaust gas temperature sensor 33, an exhaust gas pressure sensor 34, and a catalyst temperature sensor 35.

The in-cylinder pressure sensor 21 outputs a detection signal corresponding to a pressure (in-cylinder pressure) of the combustion chamber 11a. The in-cylinder pressure sensor 21 has a temperature detection element 21a in addition to the pressure detection element, and outputs a detection signal corresponding to a temperature (in-cylinder temperature) of the combustion chamber 11a. The oxygen concentration sensor 22 is equipped to the intake pipe 16in and outputs a detection signal corresponding to an oxygen concentration in the intake air. The intake air to be detected is a mixture of fresh air and EGR gas. The rail pressure sensor 23 is equipped to the common rail 15 c and outputs a detection signal corresponding to the pressure (rail pressure) of the accumulated fuel. The crank angle sensor 24 outputs a detection signal corresponding to the rotational speed (engine speed) of the crankshaft that is rotationally driven by the piston 13. The accelerator pedal sensor 25 outputs a detection signal corresponding to the depression amount (engine load) of an accelerator pedal depressed by a vehicle driver.

The exhaust gas temperature sensor 33 is equipped to the exhaust pipe 16ex, and detects an exhaust gas temperature. The exhaust gas pressure sensor 34 is equipped to the exhaust pipe 16ex, and detects an exhaust gas pressure. The exhaust gas temperature sensor 33 and the exhaust gas pressure sensor 34 are located between the NOx purification catalyst 31 and the turbine in the exhaust pipe 16ex.

The catalyst temperature sensor 35 is located between the NOx purification catalyst 31 and the DPF 32 in the exhaust pipe 16ex and detects an internal temperature of the NOx purification catalyst 31, thereby to detect the temperature of the exhaust gas that has passed through the NOx purification catalyst 31. The catalyst temperature sensor 35 may be equipped to the NOx purification catalyst 31.

The ECU 80 controls operations of the fuel injection valve 15, the fuel pump 15p, the EGR valve 17a, the temperature control valve 17d, and the supercharging pressure regulator 26, based on the respective detection signals of the sensors 21 to 25 and 33 to 35. In this way, a fuel injection start timing, the injection amount, an injection pressure, an EGR gas flow rate, an intake manifold temperature and a supercharging pressure are controlled.

While controlling the operation of the fuel injection valve 15, the microcomputer 80a functions as an injection control unit 83 to control the fuel injection start timing, the injection amount, and the number of injection stages related to the multistage injection. There is a case where the injection control is performed so that the same fuel injection valve 15 injects the fuel for multiple times (multistage injection) during one combustion cycle. The multiple injection include a main injection with the largest injection amount, a pilot injection performed at a timing before the main injection, and a post injection performed at a timing after the main injection.

While controlling the operation of the fuel pump 15p, the microcomputer 80a functions as a fuel pressure control unit 84 that controls the injection pressure. While controlling the operation of the EGR valve 17a, the microcomputer 80a functions as an EGR control unit 85 that controls the EGR gas flow rate. While controlling the operation of the temperature control valve 17d, the microcomputer 80a functions as an intake manifold temperature control unit 87 that controls the intake manifold temperature. While controlling the operation of the supercharging pressure regulator 26, the microcomputer 80a functions as a supercharging pressure control unit 86 that controls the supercharging pressure.

Figure 2:
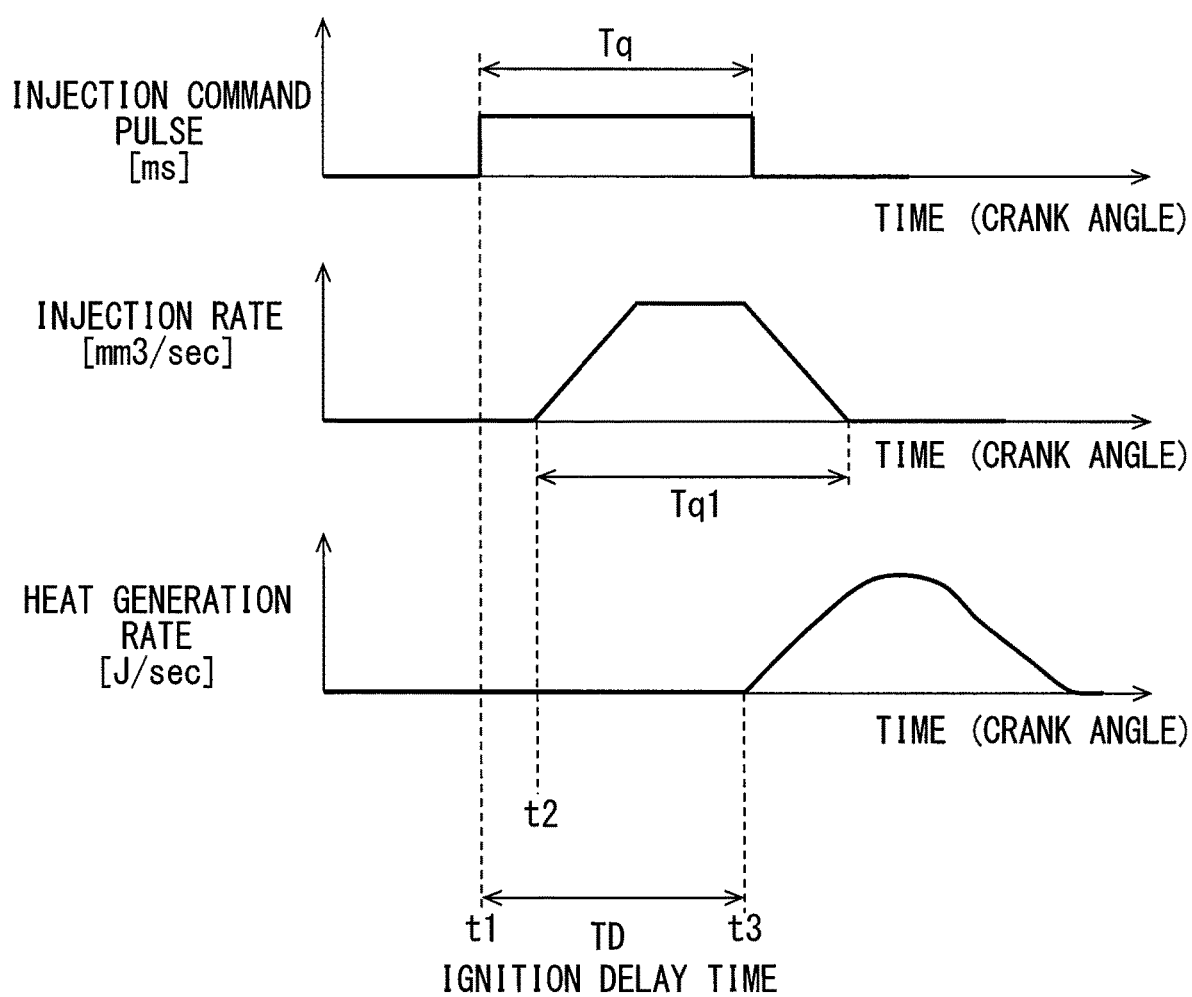

The microcomputer 80a also functions as a combustion characteristic acquisition unit 81 that acquires a detection value (combustion characteristic value) of a physical quantity relating to combustion. The combustion characteristic value according to the present embodiment represents an ignition delay time TD shown in FIG. 2. An upper part of FIG. 2 shows a pulse signal output from the microcomputer 80a. Energization of the fuel injection valve 15 is controlled according to the pulse signal. Specifically, the energization is started at a time point t1 when the pulse is on, and the energization continues in a pulse on period Tq. In short, the injection start timing is controlled according to the pulse on timing. In addition, the injection period is controlled according to the pulse on period Tq, and further, the injection amount is controlled.

A middle part of FIG. 2 shows a change in an injection state of the fuel from the injection hole, which results from the valve opening operation and the valve closing operation of the valve body according to the pulse signal. Specifically, the middle part of FIG. 2 shows a change in the injection amount (injection rate) of the fuel injected per unit time. As shown in the drawing, there is a time lag from the time point t1, when energization is started, to a time period t2 when the injection is actually started. There is also a time lag from an energization completion time point until the injection is actually stopped. A period Tq1 in which the injection is actually performed is controlled according to a pulse on period Tq.

A lower part of FIG. 2 shows a change in the combustion state of the injected fuel in the combustion chamber 11a.

Specifically, the lower part of FIG. 2 shows a change in heat quantity (heat generation rate) per unit time caused by self-ignition combustion of a mixture of the injected fuel with the intake air. As shown in the drawing, there is a time lag from the time point t2 of the injection start to a time point t3 when the combustion actually starts. In the present embodiment, a time from the time point t1, at which the energization starts, to the time point t3, at which the combustion starts, is defined as an ignition delay time TD.

The combustion characteristic acquisition unit 81 estimates the time point t3, when the combustion starts, based on the change in the in-cylinder pressure detected with the in-cylinder pressure sensor 21. Specifically, during a period, in which a crank angle rotates by a predetermined amount, after the piston 13 has reached a top dead center, a timing at which the in-cylinder pressure suddenly rises is estimated as a combustion start timing (time point t3). The ignition delay time TD is calculated by the combustion characteristic acquisition unit 81 based on the estimation result. Further, the combustion characteristic acquisition unit 81 acquires various states (combustion conditions) at the time of combustion for each combustion. Specifically, the in-cylinder pressure, the in-cylinder temperature, the intake oxygen concentration, and the injection pressure are acquired as combustion conditions.

Those combustion conditions are parameters expressing a flammability of the fuel. The air-fuel mixture is more likely to self-ignite and likely to burn as the in-cylinder pressure immediately before the combustion is higher, as the in-cylinder temperature immediately before the combustion is higher, as the intake oxygen concentration is higher, and as the injection pressure is higher. As the in-cylinder pressure and the in-cylinder temperature just before the combustion, for example, a value detected at the time point t1 at which the energization of the fuel injection valve 15 is started may be used. The in-cylinder pressure is detected with the in-cylinder pressure sensor 21. The in-cylinder temperature is detected with the temperature detection element 21*a*. The intake oxygen concentration is detected with the oxygen concentration sensor 22. The injection pressure is detected with the rail pressure sensor 23. The combustion characteristic acquisition unit 81 stores the acquired ignition delay time TD in the memory 80*b* in association to the parameters (combustion conditions) related to the combustion.

The microcomputer 80*a* also functions as a mixing ratio estimation unit 82 to estimate the mixing ratio of the molecular structural species contained in the fuel based on the multiple combustion characteristic values detected under the different combustion conditions. For example, the microcomputer 80*a* substitutes the ignition delay time TD for each different combustion condition into a determinant shown in FIG. 3 to calculate the mixing amount of the molecular structural species. The microcomputer 80*a* divides each of the calculated mixing amounts by the total amount, thereby to calculate the mixing ratio of the molecular structural species.

A matrix on the left side of FIG. 3 has x rows and one column and includes x numbers. Those numerical values represent the mixing amounts of various components. The various components are classified according to the type of molecular structure. Types of molecular structure include linear paraffins, side chain paraffins, naphthenes and aromatics.

The matrix on the left side of the right side is x rows and y columns, and has numerical values such as a00 . . . aXY. Those numerical values are constants determined on the basis of tests conducted in advance. The matrix on the right side of the right hand is y row 1 column and has y numbers. Those numerical values are the ignition delay time TD acquired with the combustion characteristic acquisition unit 81. For example, a numerical value of a first row and a first column represents an ignition delay time TD(i) acquired under a combustion condition i set in a predetermined combination of the parameters, and a numerical value of a second row and the first column represents an ignition delay time TD(j) acquired under a combustion condition j. All of the parameters are set to different values between the combustion condition i and the combustion condition j. Symbols P(i), T(i), O2(i) and Pc(i) in FIG. 3 indicate the in-cylinder pressure, the in-cylinder temperature, the intake oxygen concentration, and the injection pressure under the combustion condition i, respectively. Symbols P(j), T(j), O2(j) and Pc(j) indicate the respective parameters under the combustion condition j.

Subsequently, a description will be made on a theory that the mixing amount of the molecular structural species can be calculated by substituting the ignition delay time TD for each combustion condition in the determinant of FIG. 3 with reference to FIGS. 4, 5, and 6.

As shown in FIG. 4, since the air-fuel mixture is more likely to self-ignite as the concentration of oxygen (in-cylinder oxygen concentration) contained in the air-fuel mixture related to the combustion is higher, the ignition delay time TD becomes shorter. Three solid lines (1), (2) and (3) in the drawing are characteristic lines showing the relationship between an in-cylinder oxygen concentration and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder oxygen concentration is O2(i), it can be estimated which molecular structural species is targeted. In particular, by comparing the ignition delay time TD in a case where the in-cylinder oxygen concentration is O2(i) with the ignition delay time TD in a case where the in-cylinder oxygen concentration is O2(j), the mixing ratio can be estimated with higher precision.

Similarly, as shown in FIG. 5, since the self-ignition tends to occur more easily as the in-cylinder temperature becomes higher, the ignition delay time TD becomes shorter. Three solid lines (1), (2) and (3) in the drawing are characteristic lines showing a relationship between the in-cylinder temperature and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder temperature is B1, it can be estimated which molecular structural species is targeted. In particular, by comparing the ignition delay time TD in a case where the in-cylinder temperature is T(i) with the ignition delay time TD in a case where the in-cylinder temperature is T(j), the mixing ratio can be estimated with higher precision.

Further, the molecular structural species highly influenced by the characteristic line relating to the in-cylinder oxygen concentration (refer to FIG. 4) is different from the molecular structural species highly influenced by the characteristic line relating to the in-cylinder temperature (refer to FIG. 5). As described above, the molecular structural species having a high degree of influence is different according to the characteristic lines relating to the respective multiple combustion conditions. Therefore, based on the combination of the ignition delay times TD obtained by setting the multiple parameters (combustion conditions) to different values, it can be estimated which of the molecular structural species has a high mixing ratio, for example, as shown in FIG. 6.

The molecular structural species A exemplified in FIG. 6 is a molecular structural species having a high degree of influence on the characteristic line (first characteristic line) related to the in-cylinder oxygen concentration (first parameter). In addition, the molecular structural species B is a molecular structural species having a high degree of influence on the characteristic line (second characteristic line) relating to the in-cylinder temperature (second parameter). The molecular structural species C is a molecular structural species having a high degree of influence on the characteristic line (third characteristic line) relating to the third parameter. The molecular structural species A is mixed more, as a change in the ignition delay time TD appears more with respect to a change in the first parameter. In a similar manner, the molecular structural species B are mixed more, as a change in the ignition delay time TD appears more with respect to a change in the second parameter. The molecular structural species B is mixed more, as a change in the ignition delay time TD appears more with respect to a change in the third parameter. Therefore, the mixing ratio of the molecular structural species A, B, C can be estimated for each of the different fuels (1), (2) and (3).

Subsequently, the processing of a program to be executed by the combustion characteristic acquisition unit 81 will be described. The processing is executed each time a pilot injection is commanded.

First, the combustion characteristic acquisition unit 81 estimates the time point t3 of the combustion start based on the detection value of the in-cylinder pressure sensor 21 as described above, and calculates the ignition delay time TD related to the pilot injection. Subsequently, the combustion characteristic acquisition unit 81 stores the ignition delay time TD in association with the multiple parameters (combustion conditions) in the memory 80*b*.

Specifically, a numerical range, in which the respective parameters can be, is divided into multiple regions in advance, and the combinations of regions of the multiple parameters are set in advance. For example, the ignition delay time TD(i) shown in FIG. 3 represents the ignition delay time TD acquired under the combination of the regions of P(i), T(i), O2(i), and Pc(i). Likewise, the ignition delay time TD(j) represents the ignition delay time TD acquired under the combination of the regions of P(j), T(j), O2(j), and Pc(j).

If it is highly likely that another fuel has been mixed with the fuel stored in the fuel tank due to refueling by a user, it is assumed that the mixing ratio of the molecular structural species has changed and an estimated value of the mixing amount is reset. For example, the estimated value of the mixing amount is reset when an increase in the remaining fuel level is detected by a sensor that detects the remaining fuel level in the fuel tank at the time of stopping the operation of the internal combustion engine 10.

The combustion characteristic acquisition unit 81 substitutes the ignition delay time TD into the determinant of FIG. 3 to calculate the mixing amount for each molecular structural species. The combustion characteristic acquisition unit 81 changes the number of columns of the matrix representing the constant according to the sampling number, that is, the number of rows of the matrix on the right side of the right member of the determinant. Alternatively, the combustion characteristic acquisition unit 81 substitutes a preset nominal value into the matrix of the ignition delay time TD with respect to the ignition delay time TD that has not been acquired. The combustion characteristic acquisition unit 81 calculates the mixing ratio for each molecular structural species based on the mixing amount, which is calculated in this manner for each molecular structural species.

As described above, the microcomputer 80*a* also functions as the injection control unit 83, the fuel pressure control unit 84, the EGR control unit 85, the supercharging pressure control unit 86, and the intake manifold temperature control unit 87. Those control units set target values on the basis of an engine speed, an engine load, an engine coolant temperature and the like and perform a feedback control so that a control target has a target value. Alternatively, those control units performs an open control according to contents corresponding to the target value.

The injection control unit 83 sets the pulse signal of FIG. 2 so that the injection start timing, the injection amount, and the injection stage number become the target values, thereby to control (injection control) the injection start timing, the injection amount, and the injection stage number. The number of injection stages is the number of injections pertaining to the multistage injection described above. Specifically, the injection control unit 83 stores an ON time (energization time) and a pulse ON rise timing (energization start timing) of the pulse signal corresponding to the target value on a map in advance. The injection control unit 83 acquires the energization time and energization start timing corresponding to the target value from the map and sets a pulse signal.

In addition, the injection control unit 83 stores the output torque generated by the injection, emission state values such as the NOx amount and the PM amount in advance. In setting the target value based on the engine speed, the engine load and the like in next and subsequent injections, the injection control unit 83 corrects the target value based on the values stored as described above. In short, the injection control unit 83 corrects the target value so as to make a deviation between the actual output torque or emission state value, and the desired output torque or emission state value zero, and performs the feedback control.

The fuel pressure control unit 84 controls the operation of a metering valve that controls a flow rate of the fuel drawn into the fuel pump 15*p*. More specifically, the fuel pressure control unit 84 feedback controls the operation of the metering valve based on the deviation between the actual rail pressure detected with the rail pressure sensor 23 and the target pressure Ptrg (target value). As a result, the discharge amount per unit time by the fuel pump 15*p* is controlled, and the actual rail pressure is kept at the target value under the control (fuel pressure control).

The EGR control unit 85 sets a target value of the EGR amount based on the engine speed, the engine load, and the like. The EGR control unit 85 controls the EGR amount while controlling (EGR control) the valve opening degree of the EGR valve 17*a* based on the target value. The supercharging pressure control unit 86 sets a target value of the supercharging pressure based on the engine speed, the engine load, and the like. The supercharging pressure control unit 86 controls the supercharging pressure while controlling (supercharging pressure control) the operation of the supercharging pressure regulator 26 based on the above target value. The intake manifold temperature control unit 87 sets a target value of the intake manifold temperature based on the outside air temperature, the engine speed, the engine load, and the like. The intake manifold temperature control unit 87 controls the intake manifold temperature while controlling (intake manifold temperature control) the valve opening degree of the temperature control valve 17*d* based on the above target value.

Herein, the microcomputer 80a functions as an injection control unit 83 thereby to execute the fuel control processing. Herein, the injection control processing will be described with reference to the flowchart of FIG. 7. The above process is repeatedly executed in a predetermined cycle during the operation period of the internal combustion engine 10.

Figure 7:
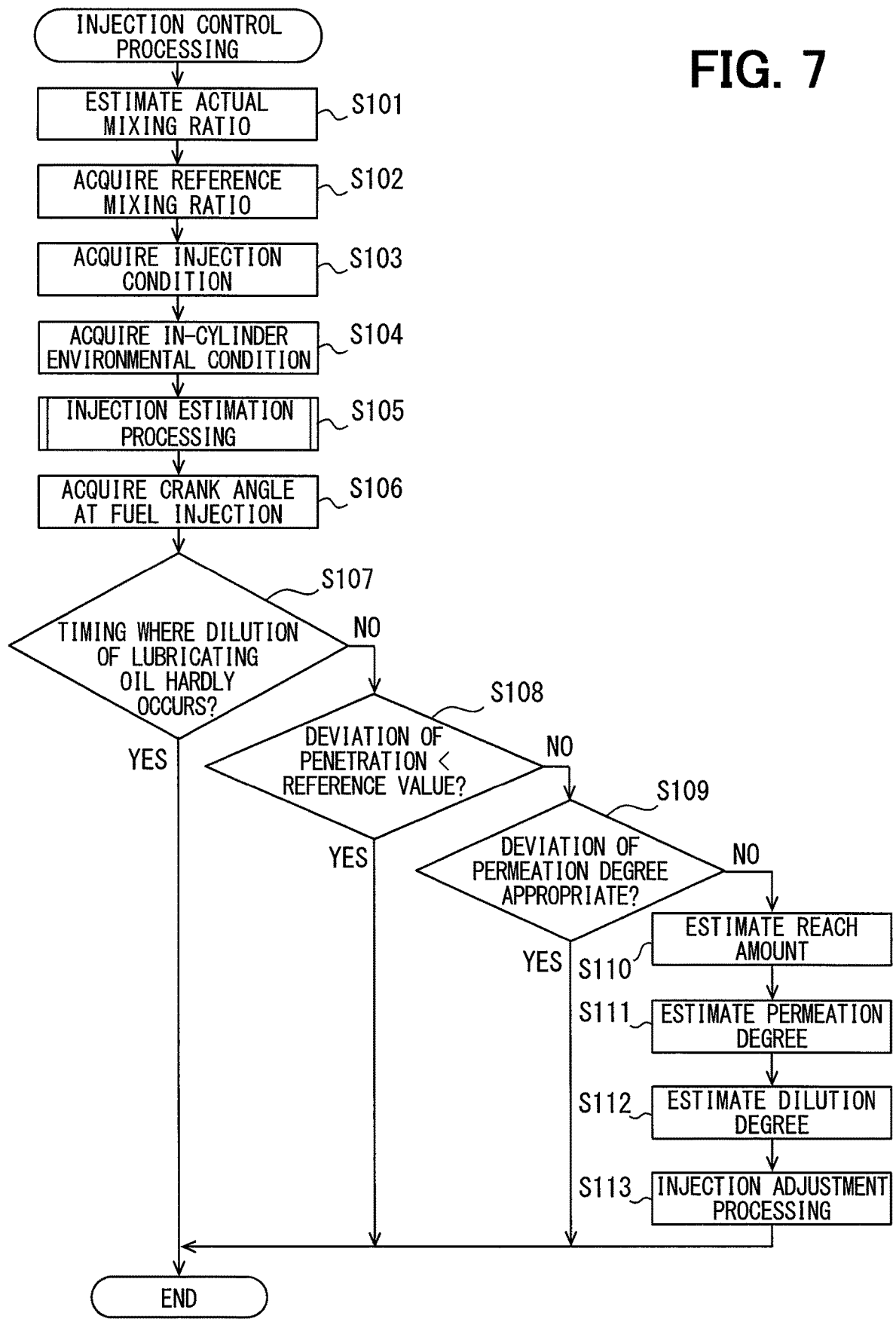

First, in step S101 of FIG. 7, the mixing ratio (an actual mixing ratio) estimated with the mixing ratio estimation unit 82 is acquired. In other words, the mixing ratio for each molecular structural species shown on the left side of FIG. 3 is acquired. On the other hand, a reference value (reference mixing ratio) of the mixing ratio for each molecular structural species is set in advance and stored in the memory 80b. Those reference mixing ratios are set in consideration of the fuel that is distributed in countries or regions where the vehicle device is used. At the present step S101, grouped molecular structural species, such as linear paraffins, side chain paraffins, naphthenes, and aromatics, are estimated. Step S101 corresponds to a mixing acquisition unit.

In step S102, the reference mixing ratio is read from the memory 80b and acquired. In step S103, an injection condition on the fuel injection is acquired. Examples of the injection conditions include a rail pressure, which is a fuel pressure in the common rail 15c, a target injection amount, which is a target value of the injection amount, an energization period for the fuel injection valve 15, a needle lift amount of the fuel injection valve 15, and the like. The rail pressure is an injection pressure under the combustion condition.

At step S104, in-cylinder environmental conditions when a fuel injection is performed are acquired. Examples of the in-cylinder environmental conditions include the in-cylinder temperature, which is the temperature of the combustion chamber 11a, the in-cylinder oxygen concentration, which is the oxygen concentration of the combustion chamber 11a, the in-cylinder flow rate, which is the flow rate of the air-fuel mixture in the combustion chamber 11a. The in-cylinder temperature is also included in the combustion conditions. Further, the in-cylinder oxygen concentration is acquired based on the intake oxygen concentration included in the combustion conditions.

In step S105, injection estimation processing is executed. The injection estimation processing will be described referring to the flowchart of FIG. 8. Even in a case where a fuel has the same property (for example, the cetane number), when the mixing ratio of the molecular structural species contained in the fuel differs, a penetration and a diffusion state of injected fuel differs in the fuel injection. For example, when the injected fuel flies excessively, the fuel reaches the piston 13 and the cylinder 19 and tends to infiltrate into the clearance between the pistons 13 and the cylinder 19.

Figure 8:
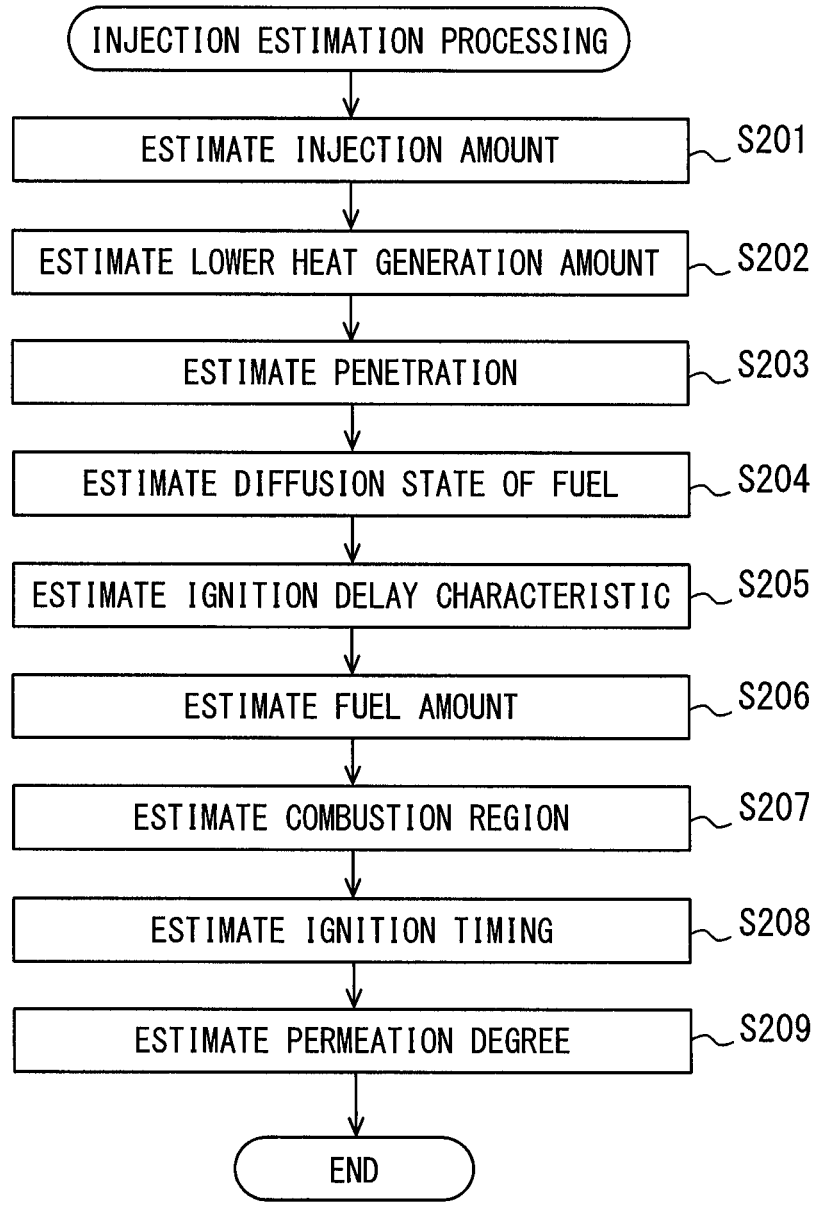

In FIG. 8, in steps S201 to S205, the injection state of fuel is estimated according to the actual mixing ratio of the molecular structural species acquired in step S101. The injection parameter, which represents the injection state of fuel, includes five parameters including the injection amount, the lower heat generation amount, the penetration, the diffusion state, and the ignition delay characteristic. For the reference fuel having the reference mixing ratio, the values of the respective injection parameters corresponding to the in-cylinder environment are acquired in advance by conducting an experiment or the like, and those acquired data are stored in the memory 80b as reference data. For the actual fuel having the actual mixing ratio, the value of each injection parameter is estimated with comparison with the reference data.

Figure 9:
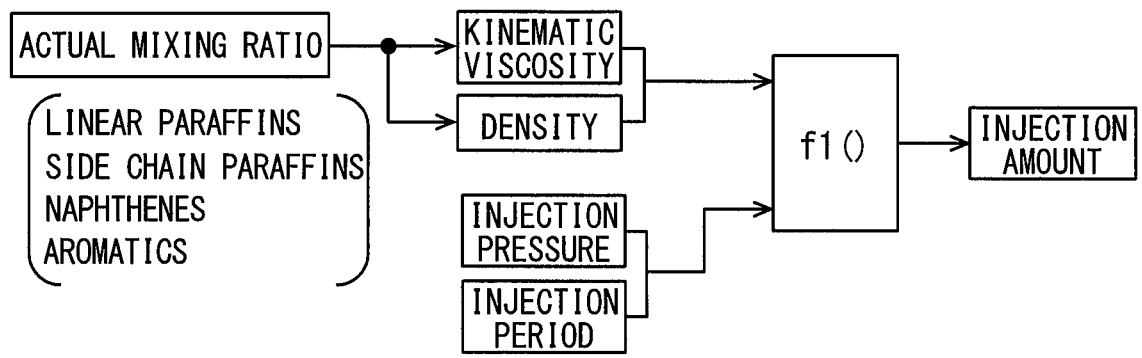

In step S201, the injection amount of fuel is estimated according to the actual mixing ratio. In this example, as shown in FIG. 9, a kinematic viscosity and a density among the general properties of the fuel are estimated on the basis of the actual mixing ratio, and the injection amount is estimated with the use of a predetermined function f1( ) for the kinematic viscosity and the density as well as the injection pressure and the injection period of the injection conditions. In that case, the kinematic viscosity and the density are parts of the fuel characteristics, which are chemically affected, and the injection pressure and the injection period are parts of the use conditions and the environmental conditions, which are physically affected. Step S201 corresponds to an injection amount estimation unit. Further, in the estimation of the injection amount, an estimation model such as a multiple regression model or a map may be used in place of the function f1( ). Furthermore, the pulse on period Tq may be used as the injection period.

Figure 10:
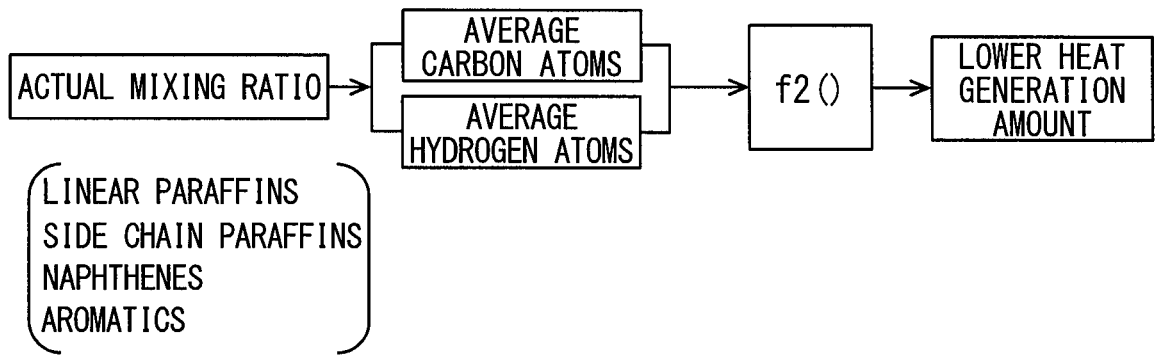

In step S202, the lower heat generation amount of the actual fuel is estimated based on the actual mixing ratio. In this example, as shown in FIG. 10, an average number of carbon atoms and an average number of hydrogen atoms of the actual fuel are estimated based on an actual mixing ratio, and the lower heat generation amount is estimated with the use of a predetermined function f2( ) for the average number of carbon atoms and the average number of hydrogen atoms. In this case, the average number of carbon atoms and the average number of hydrogen atoms are determined according to the fuel characteristics which are chemically affected. When the lower heat generation amount is estimated, an estimation model, a map, or the like may be used instead of the function f2( ). Incidentally, step S202 corresponds to a heat generation amount estimation unit.

In step S203, the penetration of the injected fuel is estimated according to the actual mixing ratio. The penetration is a penetration force indicating a force by which the fuel injected from the fuel injection valve 15 goes straight through the combustion chamber 11a. The penetration of the injected fuel tends to decrease more, as an evaporation amount in the combustion chamber 11a increases more. Therefore, by estimating the volatility of the fuel based on the multiple distillation characteristics, the penetration of the fuel is estimated. Step S203 corresponds to a penetration force estimation unit.

Figure 11:
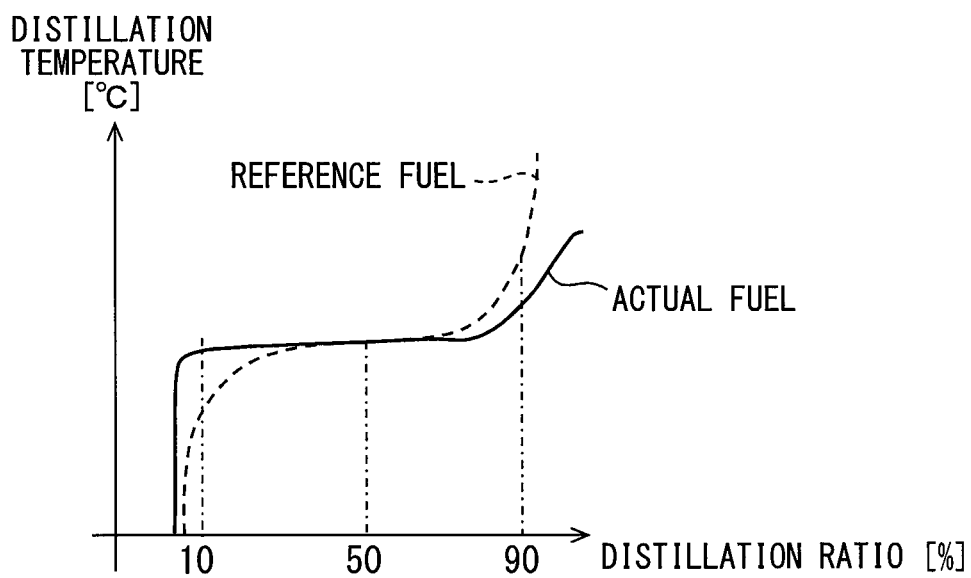

As shown in FIG. 11, in the comparison between a reference fuel at a reference mixing ratio and an actual fuel at an actual mixing ratio, even in a case where the distillation characteristics T50, at which evaporating by 50%, are the same between the reference fuel and the actual fuel, the distillation characteristics T10 and T90 may be different between the reference fuel and the actual fuel. In that case, by estimating the penetration of the fuel based on the multiple distillation characteristics, the estimation precision can be increased. In addition, the distillation characteristics T50 per se may be different greatly between the reference fuel and the actual fuel. For that reason, by comparing and estimating the distillation characteristics T50, which are the average distillation characteristics, according to the average number of carbon atoms for fuel, the estimation precision of the penetration can be enhanced.

In the fuel diffused in the combustion chamber 11a by being injected, a momentum becomes larger, as a mass of particles is larger, and the penetration tends to increase. In this case, the fuel having a higher kinematic viscosity and being less likely to be atomized tends to have a larger fuel density in spray, and the mass of the particles tends to increase. In particular, a shear force of the fuel to an air, an injection speed of the fuel in the injection hole, a density of the fuel, and the like are susceptible to the kinematic viscosity and the viscosity. In addition, the shear force of the fuel is susceptible to the in-cylinder pressure, and the shear force of the fuel tends to become higher, as the in-cylinder pressure is higher. In the fuel, the particles lose their mass more, as the volatility is higher, and the momentum becomes smaller. For example, a fuel at a low temperature from an initial boiling point of the distillation characteristics to a temperature T50 relatively trends to vaporize, and the penetration tends to be small.

In step S203, as shown in FIG. 12, the penetration is estimated based on the fuel characteristics including the density, the kinematic viscosity, and the multiple distillation characteristics, the in-cylinder environment including the in-cylinder temperature and the in-cylinder flow rate, and the injection amount estimated in step S201. The penetration is influenced by the in-cylinder environmental conditions and the injection conditions, and can be estimated with a mathematical formula as shown in FIG. 13. In the formula, penetration P1, P2, P3 . . . according to the in-cylinder environmental conditions and the injection conditions are estimated based on a predetermined constant b and the fuel characteristics such as the kinematic viscosity. The constant b includes x rows and y columns and is, for example, a matrix having numerical values b00 . . . bXY.

It is possible to estimate a provisional penetration based on the actual mixing ratio and to correct the provisional penetration with the injection amount, thereby to estimate the penetration. The distillation characteristics are estimated based on the actual mixing ratio contained in the fuel. For that reason, the fuel characteristics also include a factor of the actual mixing ratio in addition to general characteristics such as the density, the kinematic viscosity and the distillation characteristics.

Returning to FIG. 8, in step S204, the diffusion state of the injected fuel is estimated according to the actual mixing ratio. The diffusion state is a degree of diffusion indicating how much the injected fuel diffuses. The injected fuel is likely to diffuse, as the evaporation amount in the combustion chamber 11a further increases. Therefore, as with the penetration, the volatility of the combustion is estimated based on the multiple distillation characteristics to estimate the diffusion state of the fuel. Incidentally, step S204 corresponds to a diffusion estimation unit.

In step S204, as shown in FIG. 14, the diffusion state is estimated based on the fuel characteristics including the density, the kinematic viscosity, and the multiple distillation characteristics, the in-cylinder environment including the in-cylinder temperature and the in-cylinder flow rate, and the injection amount estimated in step S201. The diffusion state is influenced by the in-cylinder environmental conditions and the injection conditions, and can be estimated with a mathematical formula as shown in FIG. 15. In the formula, diffusion states D1, D2, D3 . . . according to the in-cylinder environmental conditions and the injection conditions are estimated based on a predetermined constant c and the fuel characteristics such as the kinematic viscosity. The constant c includes x rows and y columns, and is, for example, a matrix having numerical values c00 . . . cXY.

The diffusion state can also be calculated with the use of a well-known mathematical formula showing the momentum theory of spraying.

In step S205, the ignition delay characteristic of the actual fuel is estimated based on the actual mixing ratio. The ignition delay characteristic is a characteristic indicating tendency of the ignition. For example, the ignition delay characteristic is expressed by a time required for the ignition of the fuel to start in a state where the in-cylinder environment promotes the ignition. Examples of a state in which the in-cylinder environment promotes the ignition include a state in which the in-cylinder temperature and the in-cylinder pressure are sufficiently high for generation of the ignition, and the like. Step S205 corresponds to an ignition delay estimation unit.

In steps S206 to S208, the combustion state of fuel is estimated with the use of the injection parameters estimated in steps S201 to S205. The combustion parameters indicating the combustion state include three parameters including a combustion amount, a combustion region, and an ignition timing. In the reference fuel, the values of the respective combustion parameters corresponding to the in-cylinder environment are acquired in advance by conducting an experiment or the like, and as with the injection parameters, those acquired data are stored in the memory 80b as the reference data. The actual fuel is compared with reference data to estimate a value of each combustion parameter. The ignition timing corresponds to an ignition delay time TD.

In step S206, the amount of combustion caused by the fuel injection is estimated. In the estimation of the combustion amount, all of the five injection parameters including the injection amount, the lower heat generation amount, the penetration, the diffusion state, and the ignition delay characteristic are used. For example, the combustion amount is calculated with the use of a mathematical formula shown in FIG. 16. In the formula, Qburn represents the combustion amount, a represents the combustion rate, ρ×Qinj represents the injection amount, which is estimated in step S201, and A represents the lower heat generation amount, which is estimated in step S202. As shown in FIG. 17, the combustion rate a is estimated with the use of a predetermined function f3( ) for the penetration estimated in step S203, the diffusion state estimated in step S204, and the ignition delay characteristic estimated in step S205. In addition, a spray volume of the fuel injection is also estimated with the use of the penetration and the diffusion state. Step S206 corresponds to a combustion amount estimation unit.

In step S207, the combustion region caused by the fuel injection is estimated. Estimation of the combustion region uses four of the five injection parameters including the injection amount, the penetration, the diffusion state, and the ignition delay characteristic. For example, the combustion region is estimated with the use of predetermined functions, maps, models, or the like on the injection amount, the penetration, the diffusion state, and the ignition delay characteristic. Step S207 corresponds to a region estimation unit.

In step S208, the ignition estimation processing is executed to estimate the ignition timing by the fuel injection. To estimate the ignition timing, three of the five injection parameters including the injection amount, the diffusion state, and the ignition delay characteristic are used. For example, the ignition timing is estimated with the use of the predetermined function, a data map, a model, and the like for the injection amount, the diffusion state, and the ignition timing. Step S 208 corresponds to a timing estimation unit.

In step S209, a permeation degree of a fuel is estimated according to the actual mixing ratio. The permeation degree is ease of permeating of a fuel into the clearance between the piston 13 and the cylinder 19 when the fuel reaches the piston 13 and the cylinder 19. In the present example, a general property of the fuel is estimated according to the actual mixing ratio, and the permeation degree is estimated according to the general property. The fuel, which has reached into the clearance between the piston 13 and the cylinder 19, is high in the permeation degree, as the kinematic viscosity is low, and is low in the permeation degree, as the distillation characteristics is high. Therefore, the kinematic viscosity and the distillation characteristics are estimated according to the actual mixing ratio, and the permeation degree of fuel is estimated according to the kinetic viscosity and the distillation characteristics. Step S209 corresponds to a permeation estimation unit.

The permeation degree of fuel may be estimated according to the temperature of cooling water of the internal combustion engine 10 in addition to the actual mixing ratio. In the internal combustion engine 10, cooling water flows through the inside of the cylinder block 11 and the like thereby to cool the cylinder 19. When the temperature of cooling water is low temperature, the kinematic viscosity of the fuel, which has reached the inner circumferential periphery of the cylinder 19, tends to increase, and the permeation degree decreases. On the other hand, in a high load condition after the internal combustion engine 10 is warmed up, the temperature of the cylinder 19 increases, and the kinematic viscosity of the fuel, which has reached the inner circumferential periphery of the cylinder 19, tends to decrease. Therefore, the permeation degree increases.

Returning to FIG. 7, in step S106, the crank angle at the time of fuel injection is acquired according to the detection signal of the crank angle sensor 24. In the present example, as shown in FIG. 2, an actual injection timing, at which injection is actually started, is estimated according to injection command pulses and the actual mixing ratio, and the relative position of the piston 13 to the cylinder 19 at the actual injection timing is acquired. Step S106 corresponds to a relation acquisition unit.

At step S107, it is determined whether the actual injection timing is a time point at which dilution of lubricating oil hardly occurs. As shown in FIG. 18, a cavity 13b is formed as a recessed portion on an upper end surface 13a of the piston 13. The combustion chamber 11a has the inner space of the cavity 13b. The fuel injection valve 15 is located at the center position of the piston 13 in the width direction. In this case, in the width direction of the piston 13, a separation distance W of a centerline of the fuel injection valve 15 from the inner circumferential periphery of the cylinder 19 is substantially ½ of a boa radius of the piston 13. In the fuel injection valve 15, the injection axis line N, along which the injected fuel passes, extends obliquely downward, and a region, in which the fuel injected into the combustion chamber 11a diffuses, extends along the injection axis line N.

The physical relationship of the injection axis line N to the piston 13 changes, as the piston 13 displaces relative to the cylinder 19. In the left figure of FIG. 18, the piston 13 is at the top dead center TDC, and the injection axis line N intersects with the inner circumferential periphery of the cavity 13b. The fuel injection in this case is main injection or after injection, and the fuel injected from the fuel injection valve 15 hardly goes beyond the cavity 13b.

In the right figure of FIG. 18, the piston 13 has moved from the TDC toward the bottom dead center BDC, and thereby the injection axis line N intersects with the upper end surface 13a. The fuel injection in this case is pilot injection or after-injection, and the fuel injected from the fuel injection valve 15 easily reaches the upper end surface 13a of the piston 13 and the inner circumferential periphery of the cylinder 19. In this case, the fuel adhering on the inner circumferential periphery of the cylinder 19 flows along the inner circumferential periphery and infiltrates into the clearance between the piston 13 and the cylinder 19. The fuel adhering on the upper end surface 13a of the piston 13 moves along the upper end surface 13a toward the piston 13 due to an air current and the like, and thereby to infiltrate into the clearance between the piston 13 and the cylinder 19. In FIG. 18, the position of the piston 13 relative to the TDC is illustrated by a travel distance H.

In step S107, when the actual injection timing is within a time period, in which the injection axis line N intersects with the inner circumferential periphery of the cavity 13b, the actual injection timing is deemed at a time point, at which dilution of lubricating oil hardly occur, and the present injection control processing is terminated. To the contrary, when the actual injection timing is within the time period, in which the injection axis line N intersects with the upper end surface 13a of the piston 13, the actual injection timing is not deemed at the time point, at which dilution of lubricating oil hardly occur, and the process proceeds to step S108. Step S107 corresponds to an injection determination unit.

In step S108, penetration of reference fuel is read from the memory device 80b, "deviation" between the penetration of the reference fuel and the penetration of the actual fuel is calculated as a difference, and it is determined whether the difference is smaller than a predetermined reference value, or not. The difference in this case is an absolute value of the difference between the penetration of the reference fuel and the penetration of the actual fuel.

Herein, the target value of the injection parameter, such as the penetration, is set according to the operation state of the internal combustion engine 10. The determination condition of the difference is set according to the target value of the injection parameter. For example, when a depression quantity of the accelerator pedal by a driver increases, the target value of the combustion parameter is set such that the internal combustion engine 10 increases its output power.

When the difference in the penetration is smaller than the reference value, dilution of lubricating oil is deemed hardly occur, and the present injection control processing is terminated, regardless of the actual injection timing. On the other hand, when the difference in the penetration is not smaller than reference value, the process proceeds to step S109.

In step S109, it is determined whether the permeation degree of the actual fuel is appropriate. As for the reference fuel, data of the permeation degree corresponding to the in-cylinder environment is beforehand acquired through an experiment or the like, and the data is stored in the memory device 80b. In the present example, the permeation degree of the reference fuel is read from the memory device 80, "deviation" between the permeation degree of the reference fuel and the permeation degree of the actual fuel is calculated as the difference, and it is determined whether the difference is smaller than the reference value. When the difference is smaller than the reference value, the permeation degree of the actual fuel is deemed appropriate, and the present injection control processing is terminated. To the contrary, when the difference is not smaller than the reference value, the permeation degree of the actual fuel is not deemed appropriate, and the process proceeds to step S110.

At step S110, a reaching amount of the fuel to the upper end surface 13a of the piston 13 and the inner circumferential periphery of the cylinder 19 is estimated according to the injection amount, the penetration, the diffusion state, and the crank angle at the time of the fuel injection, among five injection parameters. For example, a provisional reaching amount is estimated according to the injection amount, the penetration, and the diffusion state, and the provisional reaching amount is compensated according to the position of the piston 13 at the actual injection timing, thereby the reaching amount of fuel can be estimated. Herein, the reaching amount of fuel increases, as the injection amount or the penetration increase. The reaching amount of fuel decreases, as the diffusion range increases. As for the actual injection timing of fuel, the reaching amount of fuel increases, as the travel distance H of the piston 13 increases.

In step S111, an amount of fuel, which has infiltrated into the clearance between the piston 13 and the cylinder 19, is estimated as a permeation amount according to the reaching amount of fuel estimated in step S110 and the permeation degree estimated in step S209. Herein, the permeation amount of fuel increases, as the reaching amount or the permeation degree increase.

In step S112, the dilution degree of the lubricating oil by the actual fuel is estimated according to the permeation amount of the actual fuel. Herein, the dilution degree of the reference fuel corresponding to the in-cylinder environment is beforehand acquired through an experiment or the like, and the acquisition data is stored in the memory device 80b. In the present example, the permeation degree of the reference fuel is read from the memory device 80b, and "deviation" between the dilution degree of the reference fuel and the dilution degree of the actual fuel is calculated as the difference.

In step S113, the injection adjustment processing is performed according to the dilution degree of the lubricating oil. As the injection control processing, restriction processing, which is to restrict infiltration of the fuel into the lubricating oil, and promotion processing, which is to promote infiltration of the fuel into the lubricating oil, can be taken. As shown in FIG. 19, in a state where the difference in the dilution degree exceeds an allowable range, and when the dilution degree of the actual fuel is greater than the dilution degree of the reference fuel, the dilution degree can be appropriately reduced by executing the restriction processing. On the other hand, in a state where the difference in the dilution degree exceeds the allowable range, and when the dilution degree of the actual fuel is smaller than the dilution degree of the reference fuel, the output power of the internal combustion engine 10 can be increased, while progress of the dilution degree is restricted within an allowable range, by executing the promotion processing. Step S113 corresponds to a combustion control unit.

As for the restriction processing, piston processing, penetration processing, and approaching processing can be taken. The piston processing is to reduce the travel distance H of the piston 13 at the actual injection timing. The penetration processing is to reduce the penetration. The approaching processing is to bring the combustion region closer to the fuel injection valve 15. As for the piston processing, processing to shift the injection timing of a fuel toward the TDC can be taken. As for the penetration processing, processing to decrease an injection amount, processing to increase a number of injection stages of a fuel, and processing to decrease an injection compression force can be taken. As for the approaching processing, processing to decrease an amount of EGR, processing to increase an amount of oxygen in intake air, and processing to increase an injection pressure can be taken.

As for the promotion processing, processing, which is fundamentally reverse to the restriction processing, can be taken. For example, as for the promotion processing, processing to enlarge a travel distance H of the piston 13, processing to enlarge the penetration, and processing to bring the combustion region away from the fuel injection valve 15, can be taken. As for the promotion processing, processing to increase not an injection amount of the main injection but to increase an injection amount of the post-injection can be taken. The processing facilitates to increase the exhaust gas temperature, thereby to promote increase in the temperature of a NOx purification catalyst 31 and the DPF 32 and to enhance the air/fuel ratio of an exhaust toward the rich side promptly, thereby to enhance a response of the NOx reduction of the NOx purification catalyst 31.

In the restriction processing and the promotion processing, a target value, which is to set the difference between the dilution degrees, is set to be within an allowable range according to the actual mixing ratio. In that case, a provisional target value is acquired based on the reference mixing ratio, and the provisional target value is corrected with the use of the actual mixing ratio to calculate the target value. In this way, a case, in which the injection amount is insufficient due to insufficiency of the actual mixing ratio, even though processing is implemented to increase the injection amount, can be avoided.

As follows, operational effects of the first embodiment described above will be described.

According to the first embodiment, the penetration of the actual fuel is estimated according to then actual mixing ratio. Therefore, the reaching condition of the fuel to the upper end surface 13a of the piston 13 and to the inner circumferential periphery of the cylinder 19 in the combustion chamber 11a can be grasped with sufficient accuracy. In this way, even if a fuel leaks through the clearance between the piston 13 and the cylinder 19 and the fuel comes out from the combustion chamber 11a, the dilution degree of the lubricating oil due to the fuel can be appropriately manageable. Therefore, oil loss, which is caused by contact between the piston 13 and the cylinder 19 due to dilution of the lubricating oil, and loss of the oil film, which is due to the lubricating oil flowing out of the clearance between the piston 13 and the cylinders 19, can be avoidable.

According to the first embodiment, both the penetration and the injection amount of the actual fuel are estimated according to the actual mixing ratio. Therefore, the amount of the fuel, which reaches the upper end surface 13a of the piston 13 and the inner circumferential periphery of the cylinder 19, can be grasped with sufficient accuracy.

In addition, according to the first embodiment, the penetration is estimated according to the injection amount and the actual mixing ratio. Therefore, the estimated accuracy of the penetration can be enhanced. In this case, the actual mixing ratio is used directly and indirectly at two levels in order to estimate the penetration. Therefore, the estimation accuracy of the penetration can be further enhanced.

According to the first embodiment, both the penetration and the diffusion state are estimated according to the actual mixing ratio of the actual fuel. Therefore, the rate of the fuel, which is injected into the combustion chamber 11a and reaches the upper end surface 13a of the piston 13 and the inner circumferential periphery of the cylinder 19, can be grasped appropriately.

According to the first embodiment, the permeation degree of the actual fuel is estimated according to the actual mixing ratio. Therefore, the rate of the fuel, which has reached the upper end surface 13a of the piston 13 and the inner circumferential periphery of the cylinder 19 and leaks through the clearance between the piston 13 and the cylinder 19, can be grasped appropriately. In this case, a fuel, which is high in the penetration, is low in the permeation degree, and a fuel, which is low in the penetration, is high in the permeation degree. The property of the fuel, for example, the kinematic viscosity, which is opposite to each other, is effectively used in the management of the dilution degree of the lubricating oil with the fuel.

According to the first embodiment, each of the penetration and the permeation degree is estimated according to the kinematic viscosity and the distillation characteristics. In this way, the dilution degree of the lubricating oil can be appropriately manageable for each of a fuel, which is high in either the penetration or the permeation degree, a fuel, which is high in both the penetration and the permeation degree, and a fuel, which is low in both the penetration and the permeation degree.

According to the first embodiment, the injection control processing is performed according to both the injection timing relative to the movement of the piston 13 and the penetration. Therefore, even in a case where the penetration excessively becomes large due to influence of a component of fuel, given that the fuel injection is performed at a time point, in which fuel does not reach the upper end surface 13*a* of the piston 13 and the inner circumferential periphery of the cylinder 19, the processing, which is to reduce the penetration, is not performed. Therefore, it is avoidable a case where the output of the internal combustion engine 10 decreases due to the implementation of the injection control processing even when the dilution of the lubricating oil with the fuel does not arise.

According to the first embodiment, the injection control processing is not performed when a fuel is injected at the time point, at which dilution of the lubricating oil does not likely to occur. Therefore, the injection control processing can be performed within the condition where the dilution of the lubricating oil with the fuel is in progress. In addition, in this case, determination whether "deviations" in the penetration and the permeation degree are appropriate or not is not performed. Therefore, a processing load can be reduced according to the injection timing of a fuel.

Second Embodiment

In the first embodiment, the reaching amount of a fuel to the upper end surface 13*a* of the piston 13 and to the inner circumferential periphery of the cylinder 19 in the combustion chamber 11*a* is estimated. In the second embodiment, the reaching amount of a fuel is not estimated. Injection control processing of the present embodiment will be described referring to the flowchart of FIG. 20.

In FIG. 20, in steps S301 to S305, the same processing as steps S101 to S105 of the first embodiment is performed. In step S306, it is determined whether the injection is the main injection or the after injection. When the injection is the main injection or the after injection, it is recognized that the injected fuel hardly reaches the upper end surface 13*a* of the piston 13 and the inner circumferential periphery of the cylinder 19. Thus, the present injection control processing is terminated. When the injection is not the main injection or the after injection, that is, when the injection is the pilot injection or the post-injection, it is recognized that the injected fuel likely reaches the upper end surface 13*a* of the piston 13 and the inner circumferential periphery of the cylinder 19. Thus, the injection control processing is performed at steps S307 to S312.

At step S307, similarly to step S108 of the first embodiment, it is determined whether the difference of the penetration is smaller than the reference value. When the difference is not smaller, the process proceeds to step S308. At step S308, the adjustment processing of the penetration is performed such that the difference becomes smaller than the reference value. When the penetration of the actual fuel is greater than the penetration of the reference fuel, processing, which is to decrease the injection amount, processing, which is to increase the number of the injection stages of a fuel, processing, which is to decrease the injection pressure, and the like are performed. In this case, progress of dilution of the lubricating oil with a fuel is restricted.

To the contrary, when the penetration of the actual fuel is smaller than the penetration of the reference fuel, processing, which is to increase the injection amount, processing, which is to decreases the number of the injection stages of a fuel, processing, which is to increase the injection pressure, and the like are performed. In this case, an ignition stability of the main combustion can be enhanced by enhancing a response of the catalyst temperature in a case where the post-injection is performed and by increasing the pilot combustion amount in a case where the pilot injection is performed, while restricting progress of the dilution of the lubricating oil with a fuel within an allowable range.

In step S309, the injection amount of the reference fuel is read from the memory device 80*b*, and "deviation" between the injection amount of the reference fuel and the injection amount of the actual fuel is calculated as the difference. Thus, it is determined whether the difference is smaller than a reference amount. The difference in this case is an absolute value of the difference between the injection amount of the reference fuel and the injection amount of the actual fuel. When the difference is not smaller than the reference amount, the process proceeds to step S310.

At step S310, the adjustment processing of the injection amount is performed such that the difference become smaller than the reference amount. When the injection amount of the actual fuel is greater than the injection amount of the reference fuel, processing, which is to reduce the injection amount, such as reducing the energization period of the fuel injection valve 15, is performed. In this case, the reaching amount of a fuel to the piston 13 and the cylinder 19 in the combustion chamber 11*a* is reduced. On the other hand, when the injection amount of the actual fuel is smaller than the injection amount of the reference fuel, processing, which is to increase the injection amount, such as increasing the energization period of the fuel injection valve 15, is performed. In this case, an ignition stability of the main combustion can be enhanced by enhancing a response of the catalyst temperature in a case where the post-injection is performed and by increasing the pilot combustion amount in a case where the pilot injection is performed, while restricting progress of the dilution of the lubricating oil with a fuel within an allowable range.

In step S311, it is determined whether the actual injection timing is appropriate or not. Herein, data of the injection timing according to an in-cylinder environment is beforehand acquired for the reference fuel through an experiment or the like, and the data is stored in the memory device 80*b*. In the present example, the injection timing of the reference fuel is read from the memory device 80*b*, and "deviation" between the injection timing of the reference fuel and the injection timing of the actual injection timing is calculated as the difference. Thus, it is determined whether the difference is smaller than the reference value. When the difference is smaller than the reference value, it is recognized that the actual injection timing is appropriate, and the process proceeds to step S312.

In step S312, the adjustment processing of the injection timing is performed such that the actual injection timing becomes appropriate. When the actual injection timing is retarded compared to the injection timing of the reference fuel, in a case where the injection is the pilot injection made in advance of the TDC, the injection timing is not controlled, and in a case where the injection is the post-injection, processing, which is to shift the injection timing toward the TDC is performed. In this case, progress of dilution of the lubricating oil with a fuel is restricted. On the other hand, when the actual injection timing is advanced relative to the injection timing of the reference fuel, in a case where the injection is the pilot injection, processing, which is to shift the injection timing toward the TDC, is performed, and in a case where the injection is the post-injection, the injection timing is not controlled. In this case, in a case where the injection is the post-injection, the response of the catalyst temperature can be enhanced, and in a case where the injection is the pilot injection, the ignition stability of the main combustion can be enhanced by increasing the pilot combustion amount, while progress of the dilution of the lubricating oil with a fuel is reduced within an allowable range. Steps S308, S310, and S312 correspond to a combustion control unit.

According to the second embodiment, the reaching amount of a fuel to the upper end surface 13a and the cylinder 19 of the piston 13, the permeation amount of a fuel to the clearance between the piston 13 and the cylinder 19, and the dilution degree of the lubricating oil with a fuel are not estimated. Even in this case, various control processing is performed according to the penetration, the permeation degree, and the estimation result of "deviation" in the injection timings. Therefore, the dilution degree of the lubricating oil with a fuel is appropriately manageable, while the processing load for estimating the reaching amount, the permeation amount, and the dilution degree are reduced.

OTHER EMBODIMENTS

The disclosure is not at all limited to the preferred embodiments of the disclosure described above and can be implemented in various modified forms as exemplified below. Not only combination between the elements explicitly specified in each of the embodiments to be capable of being combined with each other but also partial combination between the embodiments can be conducted even without explicit expression insofar as the combination is not particularly hindered.

As a modification 1, the mixing ratio estimation unit 82 may not estimate the mixing ratio of the molecular structural species based on the multiple combustion characteristic values, but may detect the general property of the fuel with a sensor, and estimate the mixing ratio based on the detection result. Specific examples of the above general properties include a fuel density, a kinematic viscosity, a distillation temperature, and the like.

Further, the mixing ratio may be estimated based on both of the estimation result with the mixing ratio estimation unit 82 and the detection result of the sensor. For example, the mixing ratio estimated based on one of the estimation result and the detection result may be corrected based on the other. In addition, the mixing ratio may be estimated with different methods depending on the molecular structural species. For example, the mixing ratio of the first molecular structural species is estimated based on the estimation result of the mixing ratio estimation unit 82, and the mixing ratio of the second molecular structural species is estimated based on the detection result of the sensor.

As a modification 2, instead of estimating the mixing ratio of the molecular structural species contained in the fuel, a mixing ratio of components such as hydrogen, carbon, sulfur, nitrogen, and oxygen contained in the fuel may be estimated. For example, an average number of carbon atoms, an average number of hydrogen atoms, an HO ratio which is the ratio of the number of hydrogen atoms to the number of carbon atoms, and the like can be taken as the mixing ratio for hydrogen and carbon. In the present configuration, injection parameters such as the injection amount and combustion parameters such as the combustion amount are estimated based on the mixing ratio of various components. In this way, even in a case where components contained in the actual fuel differ from each other or where the mixing ratio of the components differ, the combustion state caused by fuel injection can be estimated appropriately. The fuel component such as the average number of carbon atoms can also be referred to as an intermediate parameter.

As a modification 3, the OH radical distribution may be estimated as one of the injection parameters. The OH radical distribution represents a generating state of the OH radical in the combustion chamber 11a, and is for example, a density, an amount, a position, of the OH radical, and the like. The OH radical distribution can be estimated by using a predetermined function f3( ) on, for example, the injection amount, the lower heat generation amount, the penetration, the diffusion state, and the actual mixing ratio. When the combustion state of a fuel is estimated, an estimation accuracy can be enhanced by using the OH radical distribution. In this way, the estimation accuracy of the reaching amount of a fuel to the piston 13 and the cylinder 19 in the combustion chamber 11a can be enhanced.

According to a modification 4, the time period, in which the injection axis line N intersects with the inner circumferential periphery of the cavity 13b, may not be the time period, in which dilution of the lubricating oil hardly occurs, but a timing at which dilution of the lubricating oil easily occurs even when the injection axis line N intersects with the inner circumferential periphery of the cavity 13b. For example, an injection angle, which represents a spread angle of an injected fuel, is calculated according to the shape of an injection hole of the fuel injection valve 15, the injection pressure, and the like. Thus, a time period, in which a fuel, which spreads in a shape of a fog on the upper side of the injection axis line N, reaches the upper side of the upper end surface 13a of the piston 13, is estimated as an reaching time period according to the injection angle and the diffusion state in the time period in which the injection axis line N intersects with the inner circumferential periphery of the cavity 13b. In this case, the reaching time period as estimated among the time period, in which the injection axis line N intersects with the inner circumferential periphery of the cavity 13b, is included in a time period in which the dilution of the lubricating oil tends to occur.

As a modification 5, the control processing, which is to control the dilution degree of the lubricating oil with a fuel, may be executed according to at least one of the penetration, the injection amount, and the diffusion states, instead of according to all the penetration, the injection amount, and the diffusion states. For example, the adjustment processing may be executed according to only the penetration. Even in this case, the dilution degree of the lubricating oil is appropriately manageable.

As a modification 6, when the penetration is estimated, at least one of the fuel characteristics, the in-cylinder environment, and the injection amount may be used, instead of using all the fuel characteristics, the in-cylinder environments, and the injection amount. Even in this case, the penetration is estimated according to the actual mixing ratio, and excessive decrease in the estimation accuracy can be restricted.

As a modification 7, the penetration and the permeation degree may be estimated according to at least the distillation characteristics among the kinematic viscosity of a fuel and the distillation characteristics. Even in this case, the penetration and the permeation degree are estimated by using the actual mixing ratio, and excessive decrease in the estimation accuracy of the penetration and the permeation degree can be restricted.

As a modification 8, in the first embodiment, the injection control processing may be executed according to the reaching amount and the permeation amount of a fuel, instead of execution of the injection control processing according to the dilution degree of the lubricating oil. For example, a configuration may be employed in which "deviations" between the reaching amount and the permeation amount of the actual fuel and the reaching amount and the permeation amount of the reference fuel are calculated as differences, respectively, and the injection control processing is executed according to these differences.

As a modification 9, the injection control processing in step S113 of the first embodiment, the control processing in step 308 of the second embodiment, and the like may be executed regardless of the actual mixing ratio, instead of being executed according to the actual mixing ratio. For example, a configuration may be employed, in which in step S112 of the first embodiment, the dilution degree of the lubricating oil is estimated according to the actual mixing ratio, and thereafter, in step S113, the target injection amount and the like are set regardless of the actual mixing ratio in order to control the dilution degree of the lubricating oil.

As a modification 10, in the post combustion, the lower heat generation amount may not be used as the injection parameter, but the higher heat generation amount may be used as the injection parameter. In addition, the heat generation amount including both of the lower heat generation amount and the higher heat generation amount may be used as the injection parameter.

As a modification 11, the penetration and the permeation degree may not be individually acquired for each of the actual mixing ratio and the reference mixing ratio.

For example, the difference between the actual mixing ratio and the reference mixing ratio is calculated, and the penetration and the permeation degree are estimated according to the difference. In this case, "deviations" between the penetration and the permeation degree of the reference fuel and the penetration and the permeation degree of the actual fuel are directly estimated, respectively.

As a modification 12, the parameter, which is for determining whether the injection control processing is performed in the first embodiment, may be not the penetration and the permeation degree but may be a dilution index, which directly indicates the dilution state of lubricating oil. Herein, the amount of fuel, which reaches the upper end surface 13a of the piston 13 and the inner circumferential periphery of the cylinder 19, is affected by the penetration. To the contrary, the amount of fuel, which leaks through the clearance between the piston 13 and the cylinder 19, within the amount of fuel, which has reached, is affected by the permeation degree. Therefore, the amount of fuel contained in lubricating oil is acquired as the dilution index according to the penetration and the permeation degree.

For example, in FIG. 21, the same processing as steps S101 to S107 in the first embodiment is executed at steps S401 to S407. At step S408, a deviation between the dilution index of the reference fuel and the dilution index of the actual fuel is calculated as a difference, and it is determined whether the difference is smaller than a predetermined reference value. The difference in this case is an absolute value of the difference between the dilution index of the reference fuel and the dilution index of the actual fuel. It is noted that, data of the dilution index of the reference fuel according to the in-cylinder environment and the like is acquired beforehand through an experiment and/or the like, and the data is stored in the memory device 80b.

When the deviation of the dilution index is smaller than the reference value, the present injection control processing is terminated not to perform the injection adjustment processing. When the deviation of the dilution index is not smaller than the reference value, the processing proceeds to step S409 to perform the injection adjustment processing. At steps S409 to S412, the same processing as steps S110 to S113 in the first embodiment is performed.

As a modification 13, a property sensor for detecting a general property of a fuel may be provided. For example, a fuel tank or a common rail is provided with the property sensor for detecting a kinematic viscosity and a density of the fuel. In this configuration, the average number of carbon atoms and the average number of hydrogen atoms of the fuel may be estimated based on the detection result of the property sensor. Further, the heat generation amount such as the lower heat generation amount of the fuel may be estimated based on the detection result of the property sensor.

As a modification 14, the in-cylinder temperature may be estimated based on the in-cylinder pressure detected with the in-cylinder pressure sensor 21, instead of being detected with the temperature detection element 21a. More specifically, the in-cylinder temperature is calculated according to the in-cylinder pressure, the cylinder capacity, a gas weight in the cylinder, and a gas constant for estimation.

As a modification 15, the unit and/or the function produced with the ECU 80 as the estimation device and the control device of the combustion system can be produced with software stored in a substantive storage medium and a computer executing the software, with software alone, with hardware alone, or with a combination of the software and the hardware. In a case where the combustion system control device is produced with a hardware circuit, for example, it can be produced with an analog circuit or a digital circuit including multiple logic circuits.

The combustion chamber 11a of the internal combustion engine 10 is partitioned off with the piston 13 which moves in the inside of the cylinder 19 and its cylinder, and the estimation device 80 by above-described first disclosure is applied to the combustion system to which relative movement of the piston to a cylinder is lubricated with a lubricating oil. The estimation device 80 includes the mixing acquisition unit S101, S401 and the piercing force estimation unit S203. The mixing acquisition unit S101 and S401 acquires the mixing ratio of various components contained in a fuel injected into the combustion chamber. The piercing force estimation unit S203 estimates the piercing force of a fuel injected into the combustion chamber according to the mixing ratio acquired with the mixing acquisition unit in order to secure that the fuel injected into the combustion chamber reaches at least one of the cylinder and the piston.

According to the first disclosure, the piercing force of a fuel injected into the combustion chamber is estimated. Therefore, the amount of a fuel, which leaks through the clearance between the cylinder and the piston to be contained in lubricating oil, can be grasped. For example, as the piercing force of a fuel increases, the amount of adhesion of a fuel on the inner circumferential periphery of the cylinder and on the end surface of the piston increases. Consequently, the amount of a fuel, which leaks through the clearance between the cylinder and the piston, tends to increase. Therefore, appropriate management of the piercing force of a fuel enables to manage contamination of a fuel, which is injected into the combustion chamber, in a lubricating oil.

In addition, the piercing force is estimated according to the mixing ratio of various components contained in a fuel. Therefore, even in a case where the components contained in a fuel vary or where the mixing ratio of the components varies, contamination of a fuel, which is injected into the combustion chamber, in a lubricating oil can be appropriately managed. Therefore, even in a case where any of fuels, which have various properties, is used, dilution of a lubricating oil with a fuel can be managed appropriately.

The control device 80 according to the above-described second disclosure is applied to the combustion system. In the combustion system, the combustion chamber 11a of the internal combustion engine 10 is partitioned off with the piston 13, which moves in the inside of the cylinder 19, and the cylinder, and the relative movement of the piston to the cylinder is lubricated with a lubricating oil. The control device 80 includes the mixing acquisition unit S101 and S401, the piercing force estimation unit S203, and the combustion control unit S113. The mixing acquisition unit S101 and S401 acquires the mixing ratio of various components contained in a fuel injected into the combustion chamber. The piercing force estimation unit S203 estimates the piercing force of a fuel injected into the combustion chamber according to the mixing ratio acquired with the mixing acquisition unit in order to secure that the fuel injected into the combustion chamber reaches at least one of the cylinder and the piston. The combustion control unit S113 controls the combustion system according to the estimation result of the piercing force estimation unit.

According to the second disclosure, the same advantages as those in the first disclosure can be obtained.

The present disclosure has been described with reference to the examples, but the present disclosure is not limited to the examples or the structures. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. A control device applicable to a combustion system, in which a combustion chamber of an internal combustion engine is partitioned off with a cylinder and a piston, which is movable in the cylinder, and in which relative movement of the piston to the cylinder is lubricated with a lubricating oil, in which a fuel injection valve injects a fuel into the combustion chamber, in which an EGR valve controls a flow rate of EGR gas from an exhaust pipe through an EGR pipe to an intake pipe, and in which a fuel pump pumps the fuel to a common rail coupled to the fuel injection valve, the control device comprising:
 a computer processor and computer memory storing instructions which upon execution by the computer processor cause the control device to at least perform:
 a mixing acquisition to acquire a mixing ratio of various components contained in the fuel injected into the combustion chamber;
 a piercing force estimation to estimate a piercing force of the fuel, which is injected into the combustion chamber, according to the mixing ratio acquired in the mixing acquisition to manage reach of the fuel, which is injected into the combustion chamber, to at least one of the cylinder or the piston;
 a combustion control to control at least one of an energization of the fuel injection valve, an operation of the EGR valve, or an operation of the fuel pump, and to control the combustion system according to an estimation result of the piercing force estimation; and
 a permeation estimation to estimate a kinematic viscosity and a distillation characteristics according to the mixing ratio, and estimate a permeation degree of the fuel, which reaches the at least one of the cylinder or the piston, into a clearance between the cylinder and the piston according to the kinematic viscosity and the distillation characteristics.

2. The control device according to claim 1, wherein the control device is further configured to perform an injection amount estimation to estimate an injection amount of the fuel, which is injected into the combustion chamber, according to the mixing ratio to manage an amount of the fuel, which is injected into the combustion chamber and reaches at least one of the cylinder or the piston.

3. The control device according to claim 1, wherein
 the piercing force estimation is to estimate the piercing force according to the mixing ratio and further according to the injection amount, which is estimated with the injection amount estimation.

4. The control device according to claim 1, wherein the control device is further configured to perform a diffusion estimation to estimate a diffusion state of the fuel, which is injected into the combustion chamber, according to the mixing ratio to manage reach of the fuel, which is injected into the combustion chamber, to at least one of the cylinder or the piston.

5. The control device according to claim 1, wherein the piercing force estimation and the permeation estimation are to estimate the piercing force and the permeation degree, respectively, according to the mixing ratio and further according to the kinematic viscosity and the distillation characteristics of the fuel.

6. The control device for the combustion system according to claim 1, wherein the control device is further configured to perform:
 a relation acquisition to acquire a relationship between an injection timing, at which the fuel is injected into the combustion chamber, and a relative position of the piston to the cylinder, wherein
 the combustion control is to control the combustion system according to the estimation result of the piercing force estimation and further according to an acquisition result of the relation acquisition.

7. The control device according to claim 6, wherein
 the combustion chamber includes an inner cavity inside a recessed portion of the piston,
 wherein the control device is further configured to perform:
 an injection determination to determine whether the injection timing is a time point, at which the fuel is injected into the recessed portion, according to the acquisition result of the relation acquisition, and
 a control of the combustion system according to a determination result of the injection determination.

8. The control device for the combustion system according to claim 1, wherein the permeation estimation is to estimate the permeation degree further according to a temperature of cooling water of the internal combustion engine.

\* \* \* \* \*